United States Patent
Kunthady et al.

(10) Patent No.: US 8,106,320 B2
(45) Date of Patent: Jan. 31, 2012

(54) DECORATIVE SHEET, DECORATIVE MOLDED BODY, DECORATIVE KEY SHEET, AND DECORATIVE SHEET MANUFACTURING METHOD

(75) Inventors: Tedi Kunthady, Tokyo (JP); Masami Arai, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 196 days.

(21) Appl. No.: 12/081,887

(22) Filed: Apr. 23, 2008

(65) Prior Publication Data

US 2008/0268202 A1   Oct. 30, 2008

(30) Foreign Application Priority Data

Apr. 24, 2007   (JP) .................................. 2007-114761

(51) Int. Cl.
*H01H 9/02*   (2006.01)
*B32B 27/00*   (2006.01)
*B28B 1/00*   (2006.01)
*B28B 1/54*   (2006.01)

(52) U.S. Cl. ..................... 200/302.1; 428/192; 264/667; 264/145; 264/154

(58) Field of Classification Search .................. None
See application file for complete search history.

(56) References Cited

U.S. PATENT DOCUMENTS

| | | | |
|---|---|---|---|
| 2,950,221 A * | 8/1960 | Campbell et al. | 428/157 |
| 2,979,835 A * | 4/1961 | Scholl | 36/44 |
| 3,050,875 A * | 8/1962 | Robbins | 36/3 B |
| 3,103,774 A * | 9/1963 | Wall | 53/393 |
| 3,301,254 A * | 1/1967 | Schickendanz | 128/894 |
| 3,606,886 A * | 9/1971 | Bittner | 128/894 |
| 3,770,318 A * | 11/1973 | Fenton | 297/452.47 |
| 4,411,944 A * | 10/1983 | Moore | 428/172 |
| 4,520,248 A | 5/1985 | Woelfel | |
| 4,636,593 A | 1/1987 | Novak et al. | |
| 4,904,429 A * | 2/1990 | Takahashi et al. | 264/46.7 |
| 5,448,028 A | 9/1995 | Filion et al. | |
| 5,909,804 A * | 6/1999 | Kuratani | 200/516 |
| 6,585,435 B2 * | 7/2003 | Fang | 400/479 |
| 2001/0028712 A1 * | 10/2001 | Lahr | 379/368 |
| 2002/0027065 A1 * | 3/2002 | Kenmochi | 200/314 |
| 2002/0119287 A1 | 8/2002 | Redlin | |

(Continued)

FOREIGN PATENT DOCUMENTS

EP   1974908 A2   10/2008

(Continued)

OTHER PUBLICATIONS

European Search Report for EP Patent App. No. 08007693.8 (Feb. 3, 2011).

*Primary Examiner* — David Sample
*Assistant Examiner* — Nicole Gugliotta
(74) *Attorney, Agent, or Firm* — Cermak Nakajima LLP; Tomoko Nakajima

(57) ABSTRACT

Provided are a decorative sheet which is enhanced in durability of an edge portion of a soft feel layer thereof and which is unlikely to suffer breakage, a method of manufacturing such a decorative sheet, a decorative molded body, and a decorative key sheet. A compressed portion formed by crushing a foam layer in a thickness direction is provided at a side surface of an edge portion of a decorative sheet with a soft touch feeling.

15 Claims, 19 Drawing Sheets

U.S. PATENT DOCUMENTS

2007/0083007 A1 * 4/2007 Jacob .............................. 525/88

FOREIGN PATENT DOCUMENTS

| GB | 1357328 A | 6/1974 |
|----|-----------|--------|
| JP | 05-084775 A | 4/1993 |
| JP | 05-098041 A | 4/1993 |
| JP | 05-221271 A | 8/1993 |
| JP | 06-254885 A | 9/1994 |
| JP | 07-214716 A | 8/1995 |
| JP | 11-329149 A | 11/1999 |
| JP | 2000-158463 | 6/2000 |
| JP | 2000-268661 A | 9/2000 |
| JP | 2002-307639 A | 10/2002 |
| JP | 2005-209593 A | 8/2005 |
| JP | 2005-251640 A | 9/2005 |

* cited by examiner

Cut Line

Cut line

Fig.14(A)
Fig.14(B)
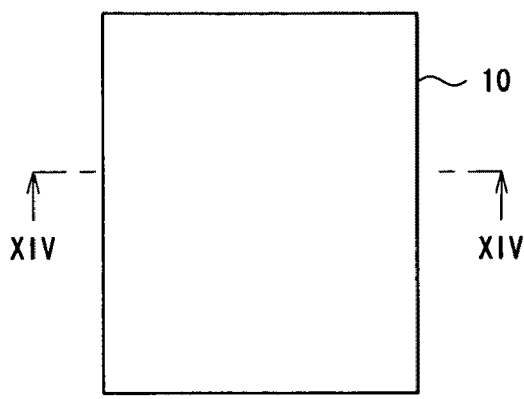
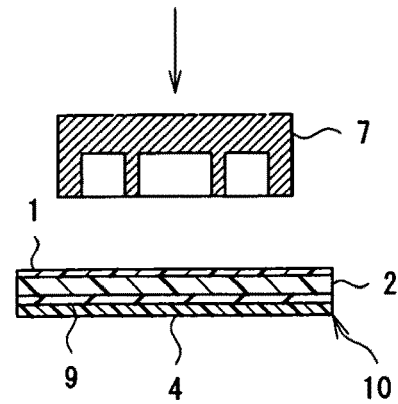
Fig.15(A)
Fig.15(B)
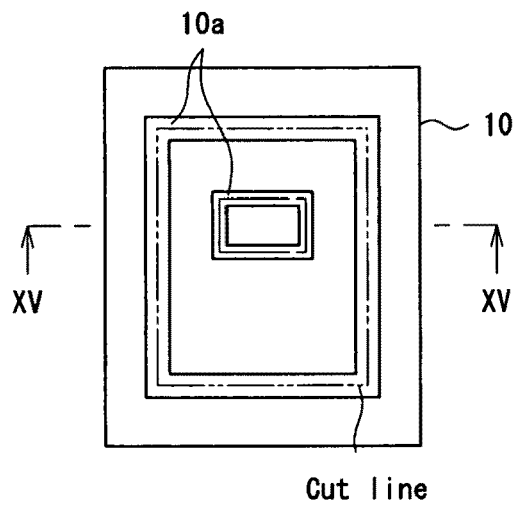
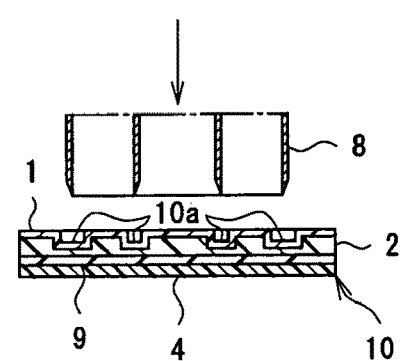

DECORATIVE SHEET, DECORATIVE MOLDED BODY, DECORATIVE KEY SHEET, AND DECORATIVE SHEET MANUFACTURING METHOD

BACKGROUND OF THE INVENTION

1. Field of the Invention

The present invention relates to a decorative sheet, which is used for covering portions of an article, where people may touch, for example, exteriors of various electronic equipment such as a personal digital assistant, OA equipment, AV equipment, and a household electrical appliance, interiors of automobiles, interior construction materials, stationery, and daily necessities, and is capable of imparting a soft feeling to the article when being touched (hereinafter, referred to as "soft touch feeling"), a decorative molded body, a decorative key sheet, and a decorative sheet manufacturing method.

2. Description of the Related Art

The exteriors of some articles, for example, various electronic equipment such as a personal digital assistant and a household electrical appliance, and the interiors of some automobiles are decorated with a soft material to provide a user with a soft touch feeling, thus adding a quality appearance to such articles for enhancement in design value and differentiation.

For example, JP 05-221271 A and JP 2000-158463 A each disclose a skin material imparting a soft touch feeling to automotive interior components. The skin material exhibits a laminate structure including an outer layer formed of a solid layer and an inner layer formed of a foamed layer, and is formed by powder slush molding.

Further, JP 05-84775 A, JP 05-98041 A, and JP 06-254885 A each disclose a technology for obtaining a molded product with a soft touch feeling through integration of a soft touch sheet and a molding resin. In this soft touch sheet, foaming beads, hollow beads, elastic particles, or the like are mixed in a resin, and the composition thus obtained is formed into a sheet through coating or drawing; further, a foamed resin layer is stacked thereon. Then, this soft touch sheet is inserted into a mold for injection molding to perform resin injection molding, thereby obtaining a molded product through integration of the soft touch sheet with a resin molded body. As compared with a case of later-attaching the soft touch sheet onto a surface of the resin molded body, the above manufacturing technology, in which integration is thus effected through insert molding, is more advantageous in that a working efficiency thereof is excellent and the manufacturing is easy.

Incidentally, when applying to a product the skin material as disclosed in JP 05-221271 A and JP 2000-158463 A described above, and the soft touch sheet as disclosed in JP 05-84775 A, JP 05-98041 A, and JP 06-254885 A, the skin material and the soft touch sheet, which are in the form of sheets, are cut and attached to the external surface of the product main body. Then, a foamed layer or a foamed resin layer appears in the side surface of the edge portion of the cut skin material and of the soft touch sheet. The foamed layer and the foamed resin layer are each fragile and inferior in chemical resistance. Accordingly, when actually used with the foamed layer or the foamed resin layer exposed, the edge portion will suffer breakage, and there is a fear of the breakage gradually expanding from the edge portion. For example, when applied to a mobile (cellular) phone, the edge portion will be rubbed by fingers or clothes of a user to scrape off the foamed layer or the foamed resin layer, and sweat, hand cream or the like will be liable to adhere to the edge portion to erode the foamed layer or the foamed resin layer; in this way, the edge portion of the skin material and of the soft touch sheet will suffer breakage, with the damaged portion gradually expanding.

SUMMARY OF THE INVENTION

The present invention has been made in view of the above problems in the prior art. It is accordingly an object of the present invention to provide a decorative sheet enhanced in durability at an edge portion after cutting and unlikely to suffer breakage, a decorative molded body, a decorative key sheet, and a decorative key sheet manufacturing method.

In order to achieve the above object, the present invention adopts the following construction. According to the present invention, there is provided a decorative sheet equipped with a soft feel layer including a skin layer and a foam layer stacked on a back surface on the opposite side of an external surface of the skin layer, in which a compressed portion formed by being crushed in the thickness direction is provided at an edge portion of the foam layer.

According to the present invention, there is provided a decorative sheet equipped with a soft feel layer including a skin layer and a foam layer, in which a compressed portion is provided at an edge portion of the foam layer. The compressed portion is formed by crushing the foam layer in the thickness direction, so it contains scarcely any bubbles and is of the same structure as a solid layer. Thus, as compared with a foam layer not compressed, it is unlikely to be scraped if rubbed, and is more resistant to chemicals, thus making the edge portion of the foam layer unlikely to suffer breakage during use. Thus, as compared with the conventional skin material, it can improve durability. The decorative sheet is not used singly but the back surface of its soft feel layer is fixed to a resin molded body, a resin film or the like, so it constitutes no problem if there exists in the back surface of the soft feel layer a portion where the foam layer is exposed.

In the decorative sheet of the present invention, there is provided a through-hole extending through the thickness of the soft feel layer, and the compressed portion may be provided at the edge portion of the through-hole in the foam layer. Since the compressed portion is also provided at the hole edge portion of through-hole in the foam layer extending through the thickness of the soft feel layer, the hole edge portion of the foam layer is unlikely to be scraped if rubbed, and is resistant to chemicals, so the hole edge portion of the foam layer is unlikely to suffer breakage during use. Thus, as compared with the conventional skin material, durability can be improved.

In the decorative sheet of the present invention, the shield layer may be provided on a back surface of the soft feel layer, for interfering conductance of heat and pressure to the soft feel layer. That is, heat and pressure applied from the back surface side of the soft feel layer are buffered by the shield layer and are not easily conducted to the soft feel layer, so it is possible to diminish the influence of the heat and pressure on the soft feel layer. For example, when the decorative sheet of the present invention is formed by insert molding with the soft feel layer held in contact with the mold surface, the molten resin injected into the mold impinges upon the shield layer stacked on the back surface side of the soft feel layer, and the shield layer receives the heat and pressure of the molten resin. The received heat and pressure are buffered by the shield layer to make it hard for them to be conducted to the soft feel layer, so it is possible to diminish the influence of the heat and pressure on the foamed layer constituting the back side of the soft feel layer. The foamed layer is likely to deform in a heated state, so it is likely to be crushed when compressed while receiving heat, and, when, as in the case of the present invention, the influence of the heat and pressure on the foamed layer is small, the foamed layer can be made to be unlikely crushed, thereby being possible to restrain loss of the soft touch feeling.

In the decorative sheet of the present invention including the shield layer, it is possible for the shield layer to be formed of a rubber-like elastic material. Thus, the shield layer exhibits a distortion phenomenon, making it possible to enhance the buffering effect with respect to the pressure received. Thus, it is possible to diminish the influence of the pressure on the foamed layer, making the foamed layer unlikely to be crushed. Thus, it is possible to suppress loss of the soft touch feeling.

In the decorative sheet of the present invention including the shield layer formed of a rubber-like elastic material, the rubber-like elastic material may be made of urethane. A urethane-type rubber-like elastic material exhibits high strength and high shock absorption property, so it can further enhance the buffering effect with respect to the pressure received. Thus, it is possible to diminish the influence of the pressure received by the foamed layer, making the foamed layer unlikely to be crushed. Consequently, it is possible to suppress loss of the soft touch feeling.

When the compressed portion is thus provided on the foam layer, a step surface is formed on the decorative sheet. In the present invention, this step surface may adopt the following structure. In the decorative sheet of the present invention, it is possible to form the step surface due to the formation of the compressed portion on the external surface on the skin layer side. In this construction, when fixing the back surface of the decorative sheet to the surface of an object such as a resin molding, the back surface of the edge portion can be easily brought into intimate contact with the object, thus making the edge portion unlikely to separate.

Further, in the decorative sheet of the present invention, it is possible to form the step surface due to the formation of the compressed portion on the back surface on the base material sheet side. With this construction, it is possible to form the edge portion of the external surface of the decorative sheet as a flat surface, which is advantageous from the viewpoint of outward appearance.

Further, in the decorative sheet of the present invention, it is possible to form the step surface due to the formation of the compressed portion on both the external surface and the back surface. When the step surface is thus formed on both the external surface and the back surface, it is possible to diminish the step as compared with the case in which the step surface is solely formed on one side, thereby enhancing the conformability of the skin layer when the foam layer is compressed.

Further, according to the present invention, there is provided a decorative molded body formed of a molded body constituting a core member on whose surface a decorative sheet according to any one of the above aspects of the present invention.

In the decorative molded body of the present invention, the decorative sheet is provided on the surface of the core member, so it is possible to realize a decorative molded body with a soft touch feeling.

Further, according to the present invention, it is possible to provide a decorative key sheet constructed as follows. A first decorative key sheet is equipped with a base sheet formed of a resin film, a key top arranged on the base sheet, and a frame sheet arranged side by side with the key top, with the surface of the decorative key sheet being decorated, in which the frame sheet is formed of a decorative sheet according to any one of the above-mentioned aspects of the invention.

In the first decorative key sheet, the decorative sheet is used as a frame sheet, so it is possible to realize a decorative key sheet including a frame sheet having a soft touch feeling. In addition to the advantage like this, it is possible to realize a thin decorative key sheet included with a base sheet formed of a resin film, a key top arranged on the base sheet, and a print adhesive layer formed as a print layer and formed of a cured body held in contact with the key top, the frame sheet, and the base sheet in a softened or melted state. Then, it is possible to provide a decorative key sheet having a print adhesive layer in which the fixation positions for the key top and the base sheet and the coating thickness are accurately controlled. That is, as compared, for example, with the conventional technology in which bonding is effected with adhesive dripped onto the bottom surface of the key top, it is possible to provide a thin key sheet in which there is less fluctuation in the position and area of the bonding layer and in which the key top is fixed, and is unlikely to be detached. In particular, owing to the provision of a frame-like decorative sheet between key tops, it is possible to realize a thin decorative key sheet in which a nail top is not easily allowed to enter the gap between the key top and the base sheet, and in which the key top is unlikely to be detached.

As in the first decorative key sheet, in a second decorative key sheet, the decorative sheet is used as the frame sheet. The second decorative key sheet is a decorative key sheet which includes a base sheet formed of a resin film, and a frame sheet provided on the base sheet. The frame sheet is formed of a decorative sheet according to any one of the above-mentioned aspects of the invention, thus providing a decorative key sheet whose surface has a display portion.

In the second decorative key sheet, the frame sheet is formed by the decorative sheet, and has on its surface a display portion for displaying a character, figure, or symbol. In other words, a decorative key sheet includes both the key top and the portion corresponding to the frame formed by the decorative sheet. Since the key top is formed by the decorative sheet, it is possible to realize a decorative key sheet equipped with a key top with a soft touch feeling.

A third decorative key sheet is a decorative key sheet equipped with a base sheet formed of a rubber-like elastic material and a key top which is arranged on the base sheet and whose operating surface is decorated, in which the key top has a decorative sheet according to any one of the above-mentioned aspects of the invention.

In the third decorative key sheet, the decorative sheet is provided on the operating surface of the key top main body, so it is possible to realize a decorative key sheet provided with a key top with a soft touch feeling. In addition to the advantage like this, it is possible to effect decoration of different designs for different key tops, thus making it possible to realize a decorative key sheet of a novel design.

A fourth decorative key sheet is a decorative key sheet having, on a back surface on the opposite side of an operating surface of a depressing operation portion provided on an operation plate, a pusher protruding in the depressing direction from the back surface, in which the operation plate is formed of a decorative sheet according to any one of the above-mentioned aspects of the invention.

In the fourth decorative key sheet, the decorative sheet is used as the operation plate, so it is possible to realize a decorative key sheet provided with an operating surface with a soft touch feeling. In addition to the advantage like this, when, for example, there is provided on the back surface side of the decorative key sheet a circuit board with a belleville spring contact, the pusher protruding from the back surface can appropriately press the belleville spring contact, making it possible to realize a decorative key sheet allowing reliable depressing operation.

Further, according to the present invention, there is provided a method of manufacturing a decorative sheet equipped with a soft feel layer including a skin layer and a foam layer stacked on a back surface opposite to an external surface of the skin layer, the method including: compressing the foam layer from at least one of a side of the skin layer and a side of the foam layer so as to crush the foam layer in the thickness direction, to thereby form a bottomed groove portion; and cutting the soft feel layer in the thickness direction at the bottom surface of the groove portion.

In the decorative sheet manufacturing method of the present invention, the foam layer is compressed so as to be crushed in the thickness direction to form a bottomed groove portion, at the bottom surface of which the soft feel layer is cut in the thickness direction, so the foam layer at the cut surface contains scarcely any bubbles, and is of the same structure as a solid layer. Thus, as compared with the foam layer prior to compression, it is unlikely to be scraped if rubbed, and is more resistant to chemicals, so the edge portion of the foam layer does not easily suffer breakage during use. Thus, as compared with the conventional skin material, durability can be improved.

In the decorative sheet manufacturing method of the present invention, the groove portion may be formed in an annular configuration, and the soft feel layer may be cut in the thickness direction at the bottom surface of the annular groove portion to provide a through-hole. This makes it possible to provide a compressed portion also at the hole edge portion of the through-hole in the foam layer, so the hole edge portion of the foam layer is unlikely to be scraped if rubbed, and is resistant to chemicals, thus making the hole edge portion of the foam layer unlikely to suffer breakage during use. Thus, it is possible to achieve an improvement in terms of durability as compared with the conventional skin material.

In the decorative sheet manufacturing method of the present invention, it is possible to compress the foam layer so as to crush it in the thickness direction by heat press-fitting or ultrasonic fusion-bonding, thereby forming a bottomed groove portion. By using heat press-fitting, it is possible to conduct heat throughout the entire thickness of the foam layer, so a thick decorative sheet can be produced. By ultrasonic fusion-bonding, it is possible to apply heat to the foam layer in a short time, so the time for the compression process can be shortened.

In the decorative sheet, the decorative molded body, the decorative key sheet, and the decorative sheet manufacturing method of the present invention, the foam layer at the cut surface contains scarcely any bubbles, and is of the same structure as a solid layer, so, as compared with a non-compressed foam layer, it is unlikely to be scraped, and is more resistant to chemicals. Thus, during actual use, the edge portion of the foam layer does not easily suffer breakage, and it is possible to realize a decorative sheet of higher durability as compared with the conventional skin material, a decorative molded body and a decorative key sheet equipped with such a decorative sheet, and a method of manufacturing such a decorative sheet.

The above description of the present invention should not be construed restrictively; the advantages, features, and uses of this invention become more apparent from the following description given with reference to the accompanying drawings. Further, it is to be understood that all modifications not departing from the gist of this invention are to be covered by the scope of this invention.

BRIEF DESCRIPTION OF THE DRAWINGS

In the accompanying drawings,

FIGS. 1A through 1C are sectional views of decorative sheets according to the present invention, of which FIG. 1A is a sectional view of a decorative sheet A1, FIG. 1B is a sectional view of a decorative sheet A2, and FIG. 1C is a sectional view of a decorative sheet A3;

FIGS. 2A and 2B are explanatory views illustrating a process for manufacturing the decorative sheet A1 of the present invention, of which FIG. 2A is a plan view of a soft feel layer, and FIG. 2B is a sectional view of the soft feel layer and a jig taken along the line II-II of FIG. 2A;

FIGS. 3A and 3B are explanatory views illustrating a process for manufacturing the decorative sheet A1 of the present invention, of which FIG. 3A is a plan view of a soft feel layer, and FIG. 3B is a sectional view taken along the line III-III of FIG. 3A;

FIGS. 4A and 4B are explanatory views illustrating a process for manufacturing the decorative sheet A1 of the present invention, of which FIG. 4A is a plan view of a soft feel layer, and FIG. 4B is a sectional view of the soft feel layer and a cutter taken along the line IV-IV of FIG. 4A;

FIGS. 5A and 5B are views of the decorative sheet A1 manufactured by the manufacturing process of the present invention, of which FIG. 5A is a plan view, and FIG. 5B is a sectional view taken along the line V-V of FIG. 5A;

FIGS. 6A through 6C are sectional views of other decorative sheets according to the present invention, of which FIG. 6A is a sectional view of a decorative sheet B1, FIG. 6B is a sectional view of a decorative sheet B2, and FIG. 6C is a sectional view of a decorative sheet B3;

FIGS. 7A through 7C are sectional views of still other decorative sheets according to the present invention, of which FIG. 7A is a sectional view of a decorative sheet C1, FIG. 7B is a sectional view of a decorative sheet C2, and FIG. 7C is a sectional view of a decorative sheet C3;

FIGS. 8A and 8B are explanatory views illustrating a process for manufacturing the decorative sheet C1 of the present invention, of which FIG. 8A is a plan view of a laminate sheet, and FIG. 8B is a sectional view of the laminate sheet and a jig taken along the line VIII-VIII of FIG. 8A;

FIG. 8B is a sectional view of the laminate sheet and a cutter taken along the line IX-IX of FIG. 8A;

FIGS. 14A and 14B are explanatory views illustrating a process for manufacturing the decorative molded body shown in FIG. 12, of which FIG. 14A is a plan view of a laminate sheet, and FIG. 14B is a sectional view of the laminate sheet and a jig taken along the line XIV-XIV of FIG. 14A;

FIGS. 15A and 15B are explanatory views illustrating a process for manufacturing the decorative molded body shown in FIG. 12, of which FIG. 15A is a plan view of a laminate sheet, and FIG. 15B is a sectional view of the laminate sheet and a cutter taken along the line XV-XV of FIG. 15A;

FIGS. 30A through 30C are sectional views of through-holes formed in the decorative sheets A1 through A3 of the present invention, of which FIG. 30A is a sectional view of the decorative sheet A1, FIG. 30B is a sectional view of the decorative sheet A2, and FIG. 30C is a sectional view of the decorative sheet A3;

FIGS. 31A through 31C are sectional views of through-holes formed in the decorative sheets B1 through B3 of the present invention, of which FIG. 31A is a sectional view of the decorative sheet B1, FIG. 31B is a sectional view of the decorative sheet B2, and FIG. 31C is a sectional view of the decorative sheet B3; and FIGS. 32A through 32C are sectional views of through-holes formed in the decorative sheets C1 through C3 of the present invention, of which FIG. 32A is a sectional view of the decorative sheet C1, FIG. 32B is a sectional view of the decorative sheet C2, and FIG. 32C is a sectional view of the decorative sheet C3.

DETAILED DESCRIPTION OF THE PREFERRED EMBODIMENTS

Figure 1A:
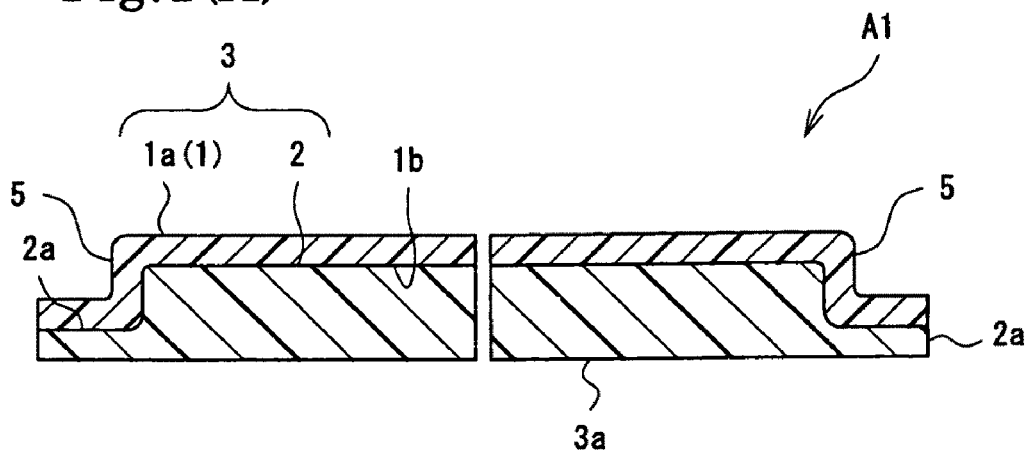

In the following, embodiments of the present invention are described with reference to the drawings. In the drawings, the reference numerals indicate portions and components. Regarding those members, materials, constructions, manufacturing methods, and operational effects which are common to the embodiments, a redundant description thereof are omitted.

Embodiment of Decorative Sheet (FIGS. 1 through 9, FIGS. 30 through 32): As an embodiment of the decorative sheet, decorative sheets A1 through C3 having sectional structures as shown in FIGS. 1, 6, and 7, and FIGS. 30 through 32 are described.

Decorative Sheet A1: As shown in FIG. 1A, in the decorative sheet A1, a skin layer 1 and a foamed layer 2 are stacked together to form a soft feel layer 3.

Figure 30A:
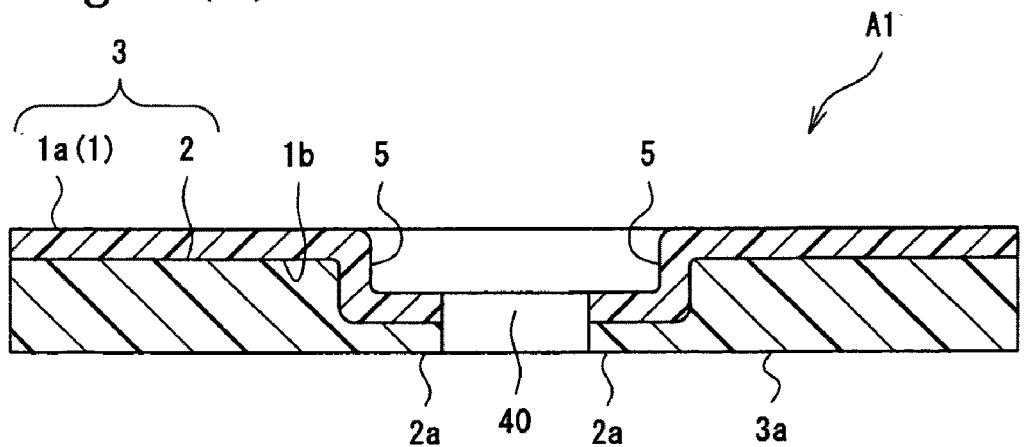

The soft feel layer 3 has the function of imparting a soft touch feeling. In the above-mentioned construction, the skin layer 1 is a solid layer constituting the surface of the soft feel layer 3; it is formed in a film-like configuration. On a back surface 1b on the side opposite to an external surface 1a of the skin layer 1, there is stacked the foamed layer 2, and the skin layer 1 protects the foamed layer 2. The foamed layer 2 is a layer constituting the back surface side of the soft feel layer 3 and containing bubbles; it is formed as a porous resin layer. Further, at an edge portion of the decorative sheet A1, there is formed a compressed portion 2a by crushing the foam layer 2 in the thickness direction; as a result of the formation of the compressed portion 2a, a step surface 5 is provided on the external surface 1a on the skin layer 1 side. Further, the soft feel layer 3 may be provided with a through-hole 40 extending through the thickness thereof. As shown in FIG. 30A, the compressed portion 2a is also formed at the edge portion of the through-hole 40.

Here, the materials of the components of the decorative sheet A1 are described. As the material of the skin layer 1, it is possible to use a resin or elastomer superior in wear resistance, waterproofness, and chemical resistance. Examples of the material include a polyolefin-based resin such as polyethylene or polypropylene, a polystyrene-based resin such as polystyrene or styrene/maleic-anhydride copolymer, a polyurethane-based resin, a polyvinyl chloride-based resin, and thermoplastic elastomer. Then, it is possible to use a resin composition obtained by mixing foaming beads, hollow beads, elastic beads, inorganic material, etc. in such a resin. By adding such beads and inorganic material, it is possible to impart an asperity feature and diversity in feel to the skin layer 1. The foaming beads are turned into hollow beads when heated; examples of the material thereof include polyurethane, acrylic-urethane copolymer, polystyrene, and styrene-isoprene copolymer. The hollow beads are hollow spherical bodies; examples of the material thereof include a copolymer of vinylidene chloride and acrylonitrile, and cross-linked acrylic. The elastic beads are resin particles which, when released after being pressurized to undergo a change in form, are elastically restored to the former form; examples of the material thereof include a polyurethane resin, an acryl-urethane resin, a polystyrene resin, and a styrene-isoprene copolymer. Examples of the inorganic material include silicon dioxide ($SiO_2$; also called silica or silicic anhydride), hydrated silicic acid ($SiO_2 \cdot xH_2O$), and hydrated aluminum silicate ($Al_2O_3 \cdot 9SiO_2 \cdot xH_2O$). Further, various additives, for example, a coloring agent such as pigment or dye, antioxidant, and ultraviolet absorber, may be added to the above-mentioned resin composition as needed. It is also possible to transfer the asperity pattern to the external surface 1a of the skin layer 1 by using a mold releasing sheet, a mold or the like. The thickness of the skin layer 1 preferably ranges from 5 µm to 200 µm; when the thickness is less than 5 µm, the layer is liable to suffer breakage to become incapable of protecting the foamed layer 2; when the thickness exceeds 200 µm, its rigidity is rather enhanced, and the layer feels hard to the touch for the user, making it difficult to realize a soft touch feeling.

The material of the foamed layer 2 is a resin or elastomer allowing foam molding; as in the case of the material of the skin layer 1, examples of the material include a polyolefin-based resin such as polyethylene or polypropylene, a polystyrene-based resin such as polystyrene or styrene/maleic-anhydride copolymer, a polyurethane-based resin, a polyvinyl chloride-based resin, and thermoplastic elastomer. The volume ratio of the bubbles in the foam layer 2 preferably ranges from 5% to 90%. A volume ratio exceeding 90% results in a rather poor formability, making the decorative sheet rather difficult to handle. Further, that also leads to a rather poor workability in the operation of lamination or the like. A volume. ratio of less than 5% does not provide a satisfactory soft touch feeling. The thickness of the foamed layer 2 preferably ranges from 100 μm to 1000 μm, and more preferably, from 200 μm to 500 μm. When the thickness is less than 100 μm, the layer is rather hard to the touch, thus making it difficult to realize a soft touch feeling; when the thickness exceeds 1000 μm, it becomes rather difficult to maintain the form due to the elasticity of the foamed layer, making it rather difficult to perform formation in three dimensional form. The compressed portion 2a is formed by crushing an edge portion of the foam layer 2 in the thickness direction thereof. The compressed portion 2a is a layer which does not function as the foam layer 2 and which contains practically no bubbles; it is most desirable for the compressed portion 2a to be of the same structure as a solid layer like the skin layer 1. However, if the foam layer 2 is not completely crushed it is desirable for the volume ratio of the bubbles in the compressed portion 2a to be 5% or less.

Figure 2A:
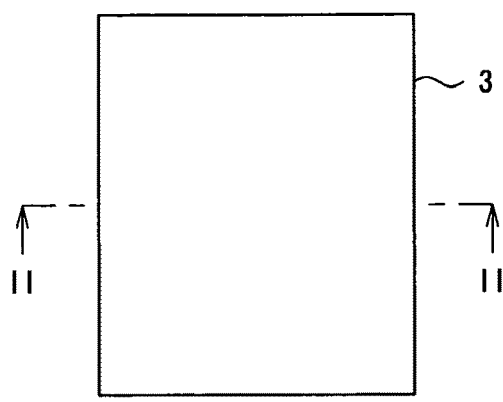
Figure 2B:
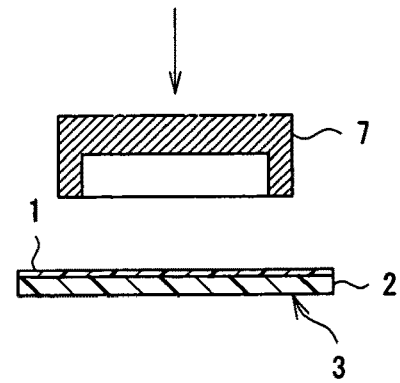
Figure 3A:
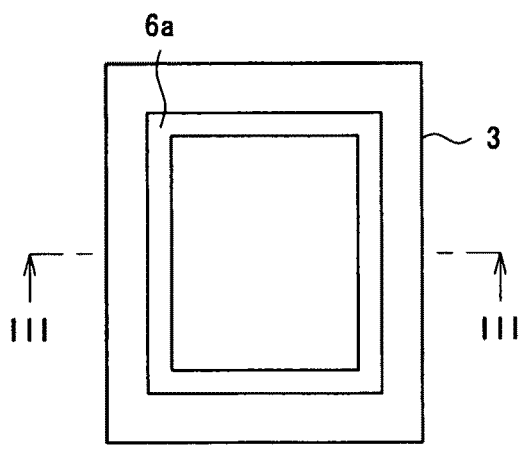
Figure 3B:
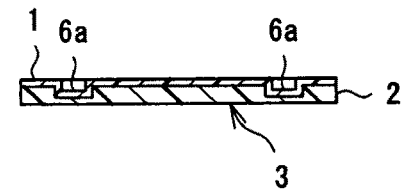
Figure 4A:
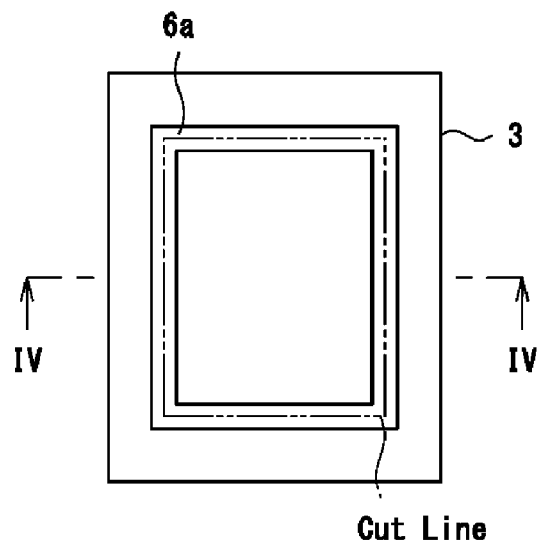
Figure 4B:
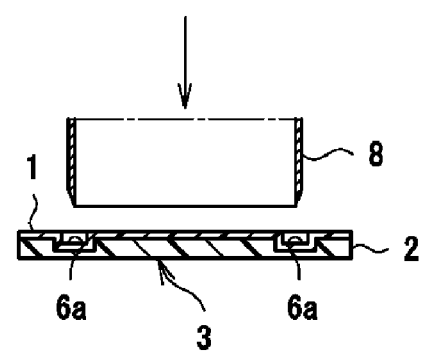
Figure 5A:
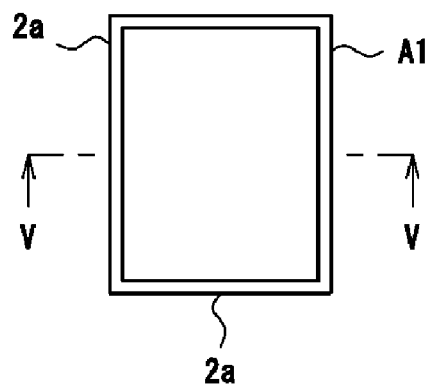
Figure 5B:
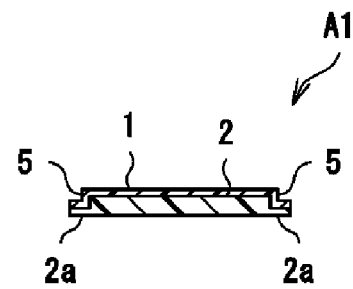

A method of manufacturing the decorative sheet A1 is described with reference to the drawings. The respective materials of the skin layer 1 and the foamed layer 2 are formed into sheets, and then stacked and fixed together for formation through laminating operation to thereby obtain a large-sized soft feel layer 3 (FIG. 2A). When, at the time of lamination, the fixation between the layers is insufficient, stacking and fixation can be effected through the intermediation of a primer layer and an adhesive layer. Apart from this manufacturing method, it is also possible to integrate the two layers with each other and then form them into a sheet, and it is also possible to effect foaming after obtaining the sheet-like object. It is also possible to use a well-known method such as the slush molding method. Next, as shown in FIG. 2B, by heat press-fitting or ultrasonic fusion-bonding, a jig 7 is pressed against the large-sized soft feel layer 3 from the skin layer 1 side, and the foam layer 2 is compressed so as to be crushed in the thickness direction, whereby a bottomed annular groove portion 6a is formed (FIGS. 3A and 3B). Further, a cutter 8 is applied to the bottom surface of the annular groove portion 6a, and stamping is performed on the soft feel layer 3 in the thickness direction (FIGS. 4A and 4B), thereby obtaining the decorative sheet A1 (FIGS. 5A and 5B). The decorative sheet A1 thus produced is formed solely of the soft feel layer 3, and there exists no surplus layer, which is desirable since it can be formed as a thin layer.

The effects of the decorative sheet A1 are described. In the decorative sheet A1, due to the presence of the compressed portion 2a, the sheet is unlikely to be scraped and more resistant to chemicals as compared with the non-compressed foam layer 2. Thus, when the back surface of the decorative sheet A1 is fixed to a resin molding or the like to use it as a molded body with the decorative sheet A1, the edge portion of the foam layer 2 does not easily suffer breakage, thus making it possible to improve durability over the conventional skin material.

Figure 1B:
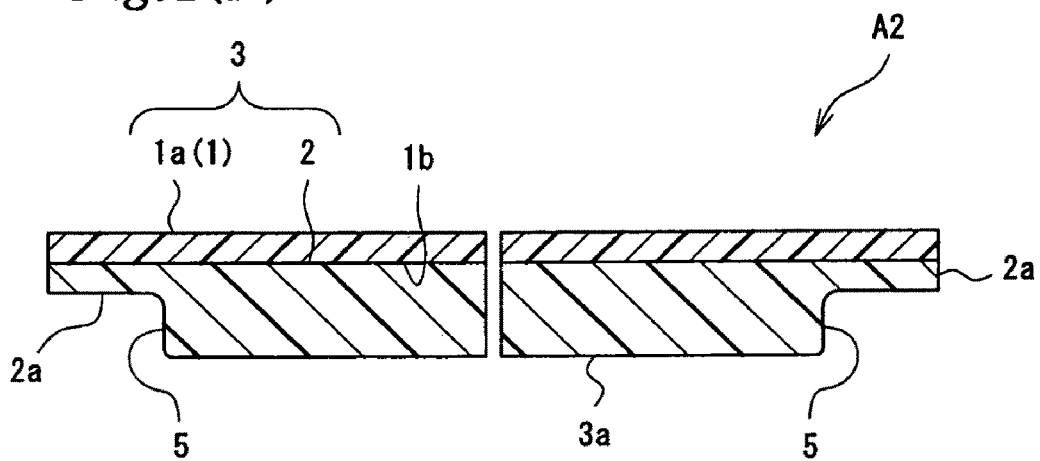

Decorative Sheet A2: As shown in FIG. 1B, the decorative sheet A2 differs from the decorative sheet A1 in that a step surface 5 is provided at the edge portion of the back surface of the soft feel layer 3. The residual construction and effects are the same as those of the decorative sheet A1.

Figure 30B:
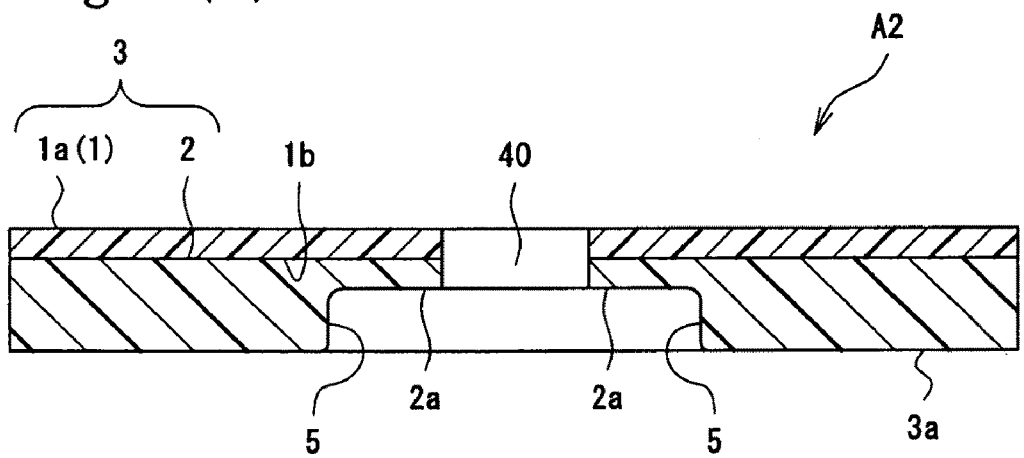

Like the decorative sheet A1, the soft feel layer 3 has the function of providing a soft touch feeling. Further, at the edge portion of the decorative sheet A2 also, the compressed portion 2a is formed by crushing the foam layer 2 in the thickness direction to provide the step surface 5; however, unlike the decorative sheet A1, the decorative sheet A2 involves no deformation of the skin layer 1. Further, the soft feel layer 3 may be provided with the through-hole 40 extending through the thickness thereof. As shown in FIG. 30B, the compressed portion 2a is also formed at the edge portion of the through-hole 40.

A method of producing the decorative sheet A2 is described. As in the case of the decorative sheet A1, the respective materials of the skin layer 1 and the foam layer 2 are formed into sheets. Next, by using heat press-fitting or ultrasonic fusion-bonding, the jig 7 is pressed against the large-sized soft feel layer 3 from the foam layer 2 side, and the foam layer 2 is compressed so as to be crushed in the thickness direction, whereby a bottomed annular groove portion is formed. Then, the cutter 8 is passed toward the bottom surface of the annular groove portion from the skin layer 1 side, and stamping is performed on the soft feel layer 3 in the thickness direction, whereby the decorative sheet A2 is obtained.

Figure 1C:
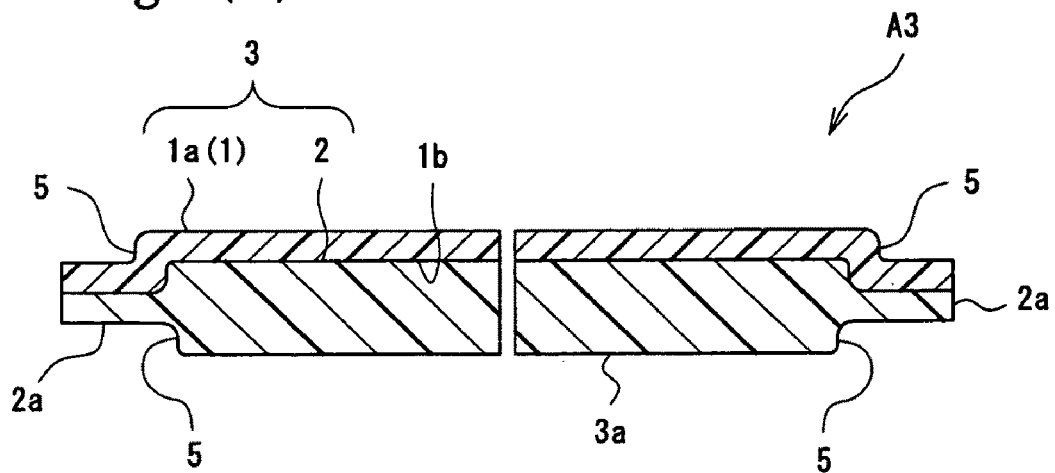

Decorative Sheet A3: As shown in FIG. 1C, the decorative sheet A3 differs from the decorative sheet A1 in that the step surface 5 is provided at the edge portion of both the external surface 1a on the skin layer 1 side and the back surface on the foam layer 2 side of the soft feel layer 3. Construction and effects of the decorative sheet A3 are the same as those of the decorative sheet A1.

Figure 30C:
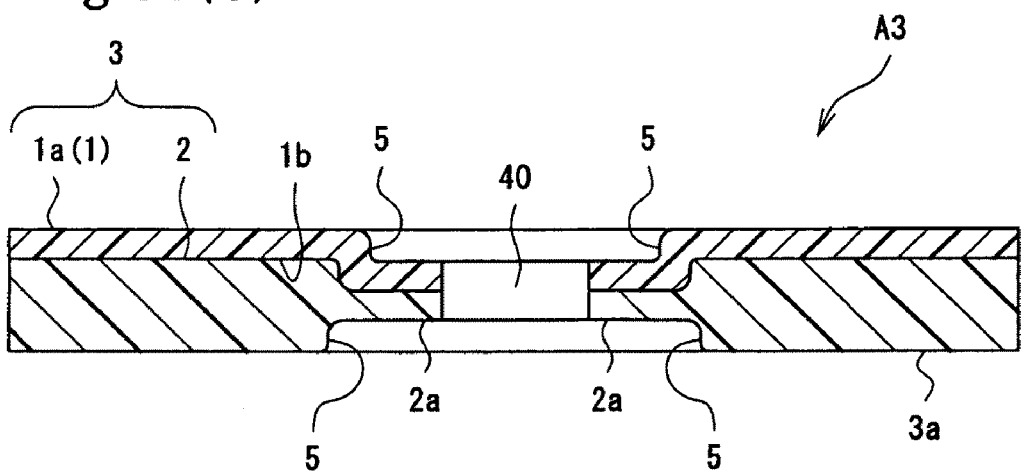

As in the case of the decorative sheet A1, the soft feel layer 3 has the function of providing a soft touch feeling. Further, at the edge portion of the decorative sheet A3 also, the foam layer 2 has the compressed portion 2a formed by being crushed in the thickness direction thereof. Further, the soft feel layer 3 may be provided with the through-hole 40 extending through the thickness thereof. As shown in FIG. 30C, the compressed portion 2a is also formed at the edge portion of the through-hole 40.

A method of manufacturing the decorative sheet A3 is described. As in the case of the decorative sheet A1, the respective materials of the skin layer 1 and the foam layer 2 are formed into sheets to obtain the large-sized soft feel layer 3. Next, by using heat press-fitting or ultrasonic fusion-bonding, the jig 7 is pressed against the large-sized soft feel layer 3 from both the skin layer 1 side and the foam layer 2 side, and the foam layer 2 is compressed so as to be crushed in the thickness direction thereof, whereby a bottomed annular groove portion is formed. Then, the cutter 8 is passed from the bottom surface of the annular groove portion on one side toward the bottom surface of the annular groove portion on the other side to perform stamping on the soft feel layer 3 in the thickness direction, thereby obtaining the decorative sheet A3.

The decorative sheets B1 through B3 described below are obtained by providing a base material sheet 4 on the back surface of each of the decorative sheets A1 through A3. In the following, the decorative sheets B1 through B3 are described in detail.

Figure 6A:
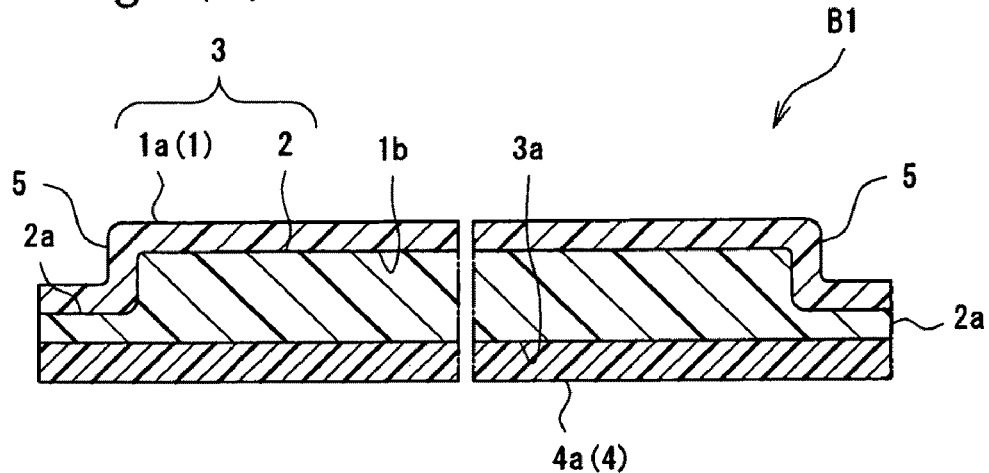

Decorative Sheet B1: As shown in FIG. 6A, the decorative sheet B1 is equipped with the soft feel layer 3 having the skin layer 1 and the foam layer 2, and the base material sheet 4, with the base material sheet 4 being stacked on the back surface 3a of the soft feel layer 3.

Figure 31A:
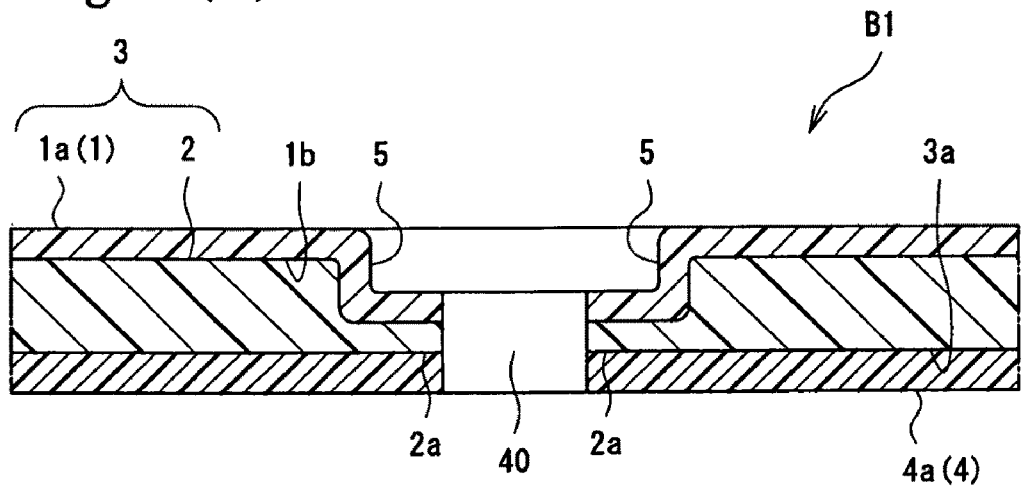

The construction of the soft feel layer 3 is the same as that of the decorative sheet A1. On the other hand, while being in the form of a film, the base material sheet 4 has the function of imparting undeformability to the decorative sheet B1. Note that, it is possible to provide the through-hole 40 extending through the thickness of the soft feel layer 3 and that of the base material sheet 4. As shown in FIG. 31A, the compressed portion 2a is also formed at the edge portion of the through-hole 40.

The base material sheet 4 is preferably formed of a hard resin; it is possible to adopt a resin whose bending elastic modulus according to JIS K7203 as defined based on ASTM-D883 is 7000 kg/cm$^2$ or more in a normal state. Specific examples of the material include thermoplastic resins such as a polypropylene resin, a polystyrene resin, a polyethylene terephthalate resin, a polybutylene terephthalate resin, a polyethylene naphthalate resin, a polybutylene naphthalate resin, an acrylonitrile-styrene-acrylate resin, an acrylonitrile-butadiene-styrene resin, a polycarbonate resin, a polyamide resin, a polyimide resin, a polyphenylene oxide resin; a polyetheretherketone resin, a polyphenylene sulfide resin, and a polyphenylene ether resin, or a composite resin of those resins. It is also possible to add a filler such as metal or glass in the form of powder or fibers to the thermoplastic resin to thereby achieve an improvement in dimensional accuracy and heat resistance. The thickness of the base material sheet 4 preferably ranges from 100 μm to 500 μm. When the thickness is less than 100 μm, the strength is rather low, and there is a fear of breakage being incurred at the time of integration with the core material resin through post-processing. Further, the rigidity is rather low in this case, and it is difficult to maintain its configuration even by performing, for example, pre-molding into a three-dimensional configuration as a pre-processing of the insert molding. When the thickness exceeds 500 μm, the rigidity is rather high, and it is rather difficult to effect, for example, pre-molding into a three-dimensional-configuration, thus making the insert molding rather difficult to perform.

A method of manufacturing the decorative sheet B1 is described. The respective materials of the skin layer 1 and the foamed layer 2 are formed into sheets, and then those layers and the base material layer 4 are stacked and fixed together through laminating operation to obtain a large-sized laminate sheet 6. If, at the time of this stacking operation, the fixation between the layers is insufficient, it is possible to perform stacking and fixation through the intermediation of a primer layer and an adhesive layer. Further, it is also possible to previously produce the soft feel layer 3, and it is also possible to laminate the base material sheet 4 on the soft feel layer 3, so there is no need to stack all the layers at a time in the lamination process. Next, by using heat press-fitting or ultrasonic fusion-bonding, the decorative sheet B1 is obtained by the same processing as that for the decorative sheet A1. The decorative sheet B1 thus produced solely is formed of the soft feel layer 3 and the base material sheet 4, and no surplus layer exists, so it can be advantageously formed as a thin sheet. After this, the compressed portion 2a is provided in the same manner as in the case of the decorative sheet A1.

The effects of the decorative sheet B1 are described. In the decorative sheet B1, the compressed portion 2a formed by being crushed in the thickness direction is provided at the edge portion of the foam layer 2, and the compressed portion 2a contains scarcely any bubbles and is of the same construction as a solid layer. As a result, it is unlikely to be scraped even if rubbed and more resistant to chemicals as compared with the non-compressed foam layer 2. Thus, during use of the decorative sheet B1, the edge portion of the foam layer 2 is unlikely to suffer breakage, thus making it possible to improve durability as compared with the conventional skin material.

Figure 6B:
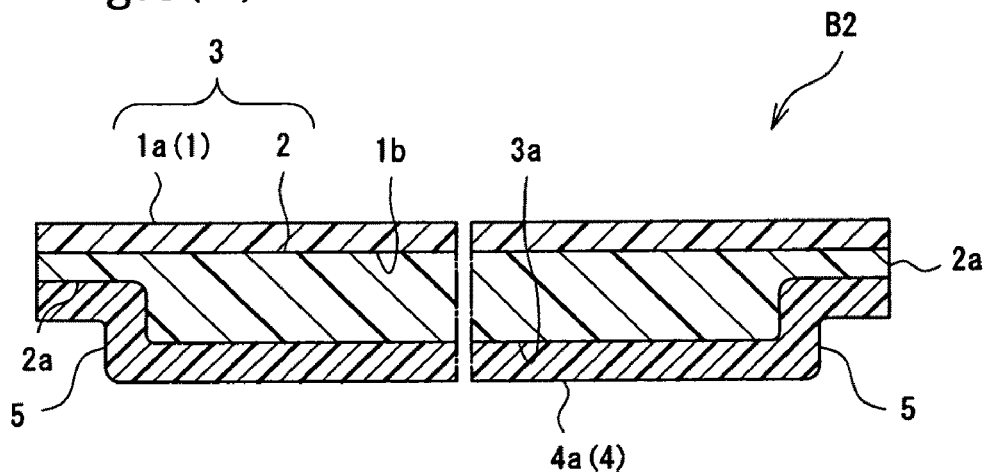

Decorative Sheet B2: As shown in FIG. 6B, the decorative sheet B2 differs from the decorative sheet B1 in the construction of the respective edge portions of the soft feel layer 3 and the base material sheet 4. The residual construction and effects are the same as those of the decorative sheet B1.

Figure 31B:
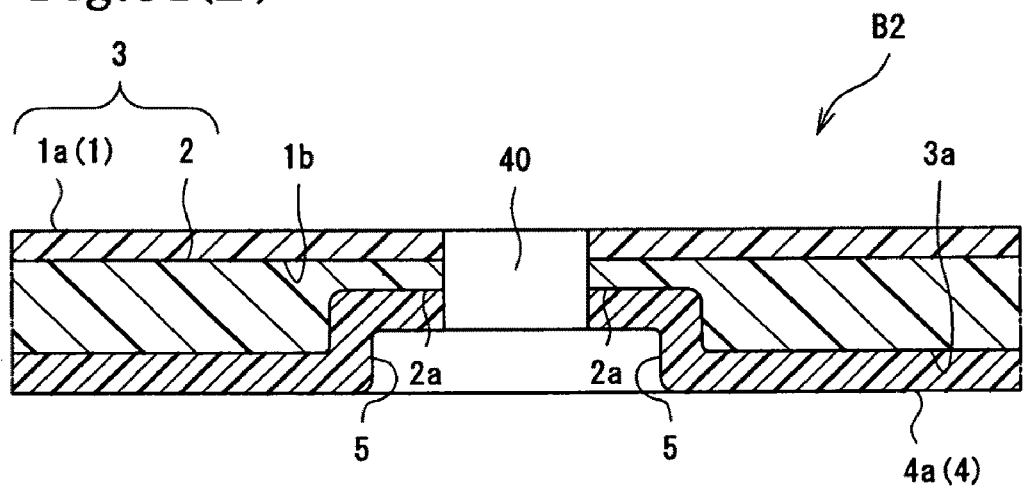

The soft feel layer 3 has the function of providing a soft touch feeling, and the base material sheet 4 has, while being in the form of a film, the function of imparting undeformability to the decorative sheet B2. Further, also at the edge portion of the decorative sheet B2, the compressed portion 2a is formed by crushing the foam layer 2 in the thickness direction; however, unlike the decorative sheet B1, the decorative sheet B2 has the step portion 5 on the back surface 4a on the base material sheet 4 side, with the compressed portion 2a being formed. Further, it is possible to provide the through-hole 40 extending through the thickness of the soft feel layer 3 and that of the base material sheet 4. As shown in FIG. 31B, the compressed portion 2a is also formed at the edge portion of the through-hole 40.

A method of manufacturing the decorative sheet B2 is described. As in the case of the decorative sheet B1, the respective materials of the skin layer 1 and the foam layer 2 are formed into sheets; then, those layers and the base material sheet 4 are stacked and fixed together through laminating operation to obtain the large-sized laminate sheet 6. Next, by using heat press-fitting or ultrasonic fusion-bonding, the jig 7 is pressed against the large-sized laminate sheet 6 from the base material sheet 4 side, and the foam layer 2 is compressed so as to be crushed in the thickness direction to thereby form a bottomed annular groove portion. Then, the cutter 8 is passed from the skin layer 1 side toward the bottom surface of the annular groove portion to perform stamping on the laminate sheet 6 in the thickness direction, thereby obtaining the decorative sheet B2.

Figure 6C:
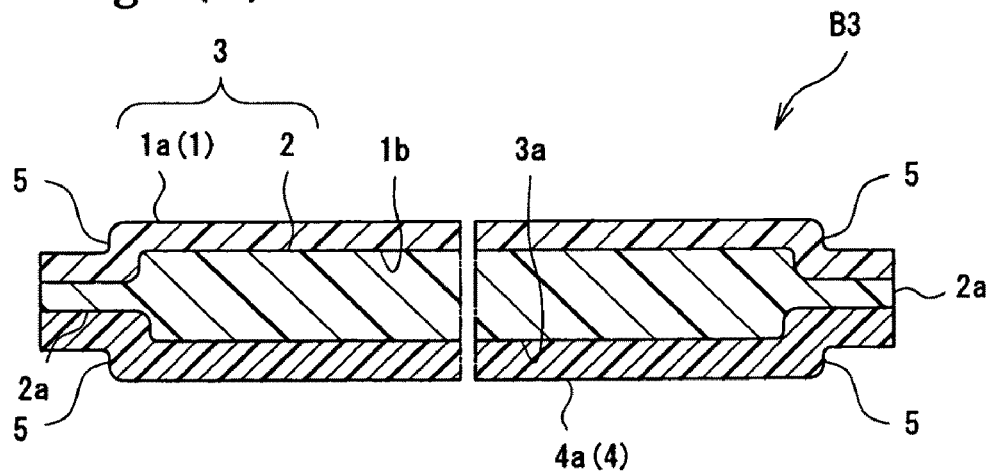

Decorative Sheet B3: As shown in FIG. 6C, the decorative sheet B3 differs from the decorative sheet B1 in the construction of the respective edge portions of the soft feel layer 3 and the base material sheet 4. The residual construction and effects are the same as those of the decorative sheet B1.

Figure 31C:
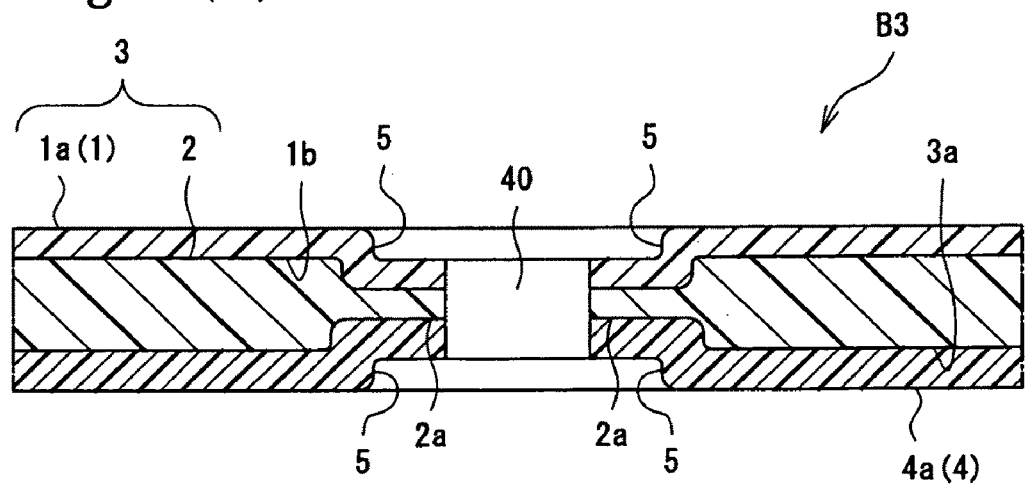

As in the case of the decorative sheet B1, the soft feel layer 3 has the function of providing a soft touch feeling, and the base material sheet 4 has, while being in the form of a film, the function of imparting undeformability to the decorative sheet B3. Further, also at the edge portion of the decorative sheet B3, the compressed portion 2a is formed by crushing the foam layer 2 in the thickness direction; however, unlike the decorative sheet B1, the decorative sheet B3 has, as a result of the formation of the compressed portion 2a, the step surface 5 on both the external surface 1a on the skin layer 1 side and the back surface 4a on the base material sheet 4 side. Further, it is possible to provide the through-hole 40 extending through the thickness of the soft feel layer 3 and that of the base material sheet 4. As shown in FIG. 31C, the compressed portion 2a is also formed at the edge portion of the through-hole 40.

A method of manufacturing the decorative sheet B3 is described. As in the case of the decorative sheet B1, the respective materials of the skin layer 1 and the foamed layer 2 are formed into sheets, and then those layers and the base material layer 4 are stacked and fixed together through laminating operation to obtain a large-sized laminate sheet 6. Next, by using heat press-fitting or ultrasonic fusion-bonding, the jig 7 is pressed against the large-sized laminate sheet 6 from both the skin layer 1 side and the base material sheet 4 side, and the foam layer 2 is compressed so as to be crushed in the thickness direction to thereby form bottomed annular groove portions. Then, the cutter 8 is passed from the bottom surface of the annular groove portion on one side toward the bottom surface of the annular groove portion 6b on the other side to perform stamping on the laminate sheet 6 in the thickness direction, thereby obtaining the decorative sheet B3.

The decorative sheets C1 through C3 described below are obtained by providing an elastic layer 9 as a "shield layer" between the foam layer 2 and the base material sheet 4 of each of the decorative sheets B1 through B3. In the following, the decorative sheets C1 through C3 are described in detail.

Figure 7A:
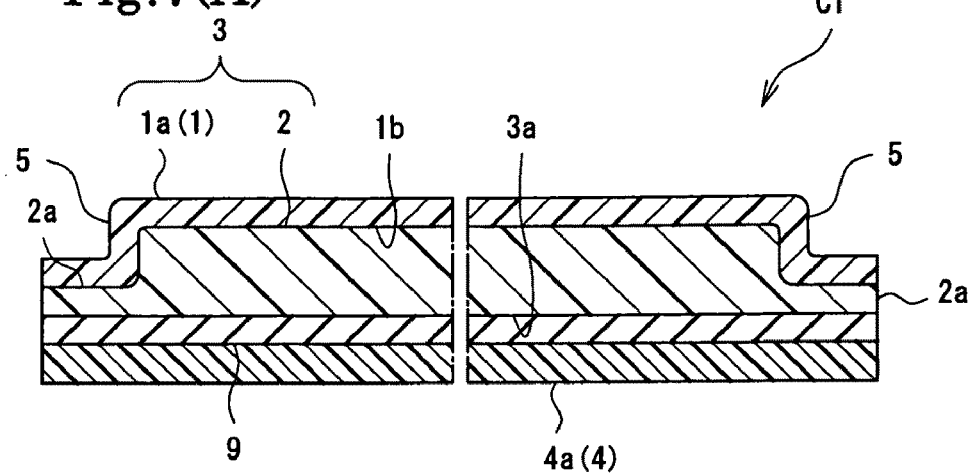

Decorative Sheet C1: As shown in FIG. 7A, the decorative sheet C1 differs from the decorative sheet B1 in that there is provided an elastic layer 9. The residual construction is the same as that of the decorative sheet B1.

Figure 32A:
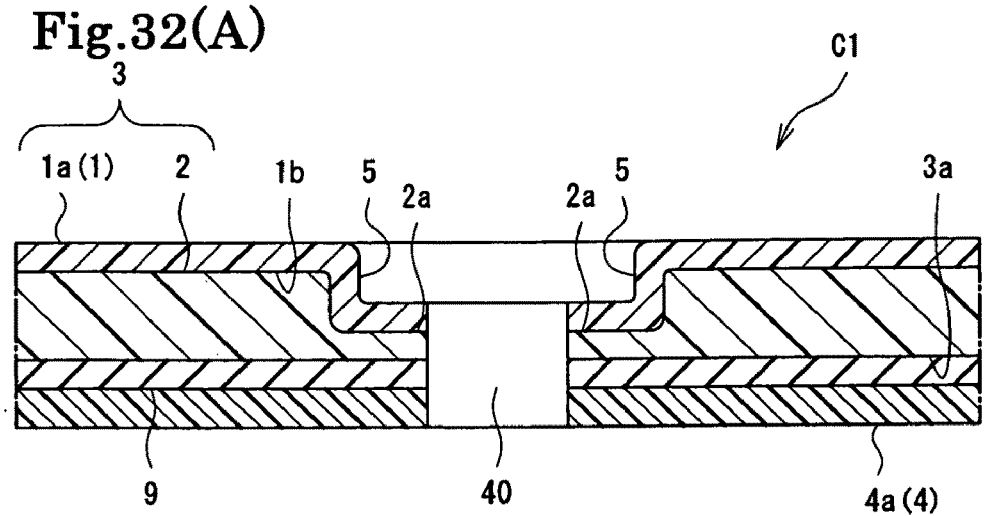

The elastic layer 9 is a solid layer held between the back surface 3a of the soft feel layer 3 and the base material sheet 4; it is a layer having the function of interfering the conductance of heat and pressure to the base material sheet 4 to be conducted to the soft feel layer 3. It is possible to provide the through-hole 40 extending through the thickness of the soft feel layer 3, that of the base material sheet 4, and that of the elastic layer 9. As shown in FIG. 32A, the compressed portion 2a is also formed at the edge portion of the through-hole 40.

Here, the material of the elastic layer 9 is described. As the material of the elastic layer 9, it is possible to use a rubber-like elastic material such as thermosetting rubber or thermoplastic elastomer; particularly suitable is a material having low heat conductivity, exhibiting high heat absorption property, buffering compression pressure, and absorbing compression pressure. As the thermosetting rubbers, there are exemplified natural rubber, silicone rubber, ethylene-propylene rubber, butadiene rubber, isoprene rubber, and urethane rubber. As the thermoplastic elastomer, there are exemplified, styrene-based thermoplastic elastomer, olefine-based thermoplastic elastomer, ester-based thermoplastic elastomer, and urethane-based thermoplastic elastomer. Apart from the rubber-like elastic material, polyethylene which is a semi-rigid resin, and styrene/butadiene block copolymer which is endowed with both transparency and shock resistance, can be suitably used since they have low heat conductivity, exhibit high heat absorption property, and buffer and absorb compression pressure. Of those materials, particularly suitable is urethane rubber or urethane-based thermoplastic elastomer, which has high tensile characteristics and high tear strength, which exhibits high compression pressure buffering property and shock absorption property, and which is superior in lamination workability. Further, taking into consideration the adhesion property and bonding property with respect to the foamed layer 2 and the base material sheet 4, and the process for stacking together the foamed layer 2 and the base material sheet 4, urethane type thermoplastic elastomer is more preferable. The thickness of the elastic layer 9 is preferably 50 μm or more, and more preferably ranges from 150 μm to 500 μm. When the thickness of the elastic layer 9 is less than 50 μm, the buffer effect with respect to heat and pressure is rather low, and it is impossible to keep at low level the heat and pressure received by the foamed layer 2 of the soft feel layer 3. Thus, the foamed layer is liable to be crushed, and there is a fear of the soft touch feeling being impaired. When the thickness is not less than 50 μm but less than 150 μm, it is possible to restrain conduction of heat and pressure to the soft feel layer 3, so the foamed layer 2 is not easily crushed. When the thickness is not less than 150 μm, the load when deforming the surface of the decorative sheet C1 obtained is small, and it is possible to impart a satisfactory soft touch feeling for the operator. When the thickness exceeds 500 μm, it is possible to sufficiently restrain conduction of heat and pressure to the soft feel layer 3; however, the entire thickness of the decorative sheet C1 becomes rather large; from the viewpoint of a reduction in thickness, a thickness of 500 μm or less is preferable.

Figure 8A:
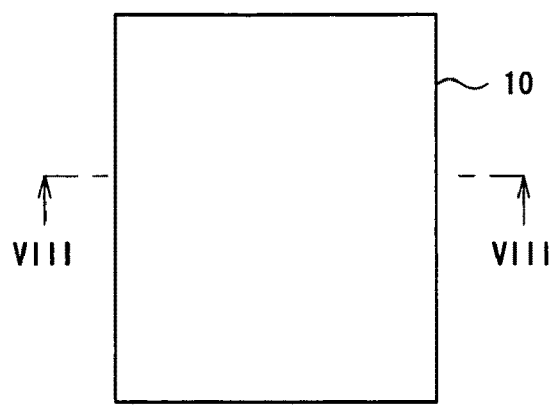
Figure 8B:
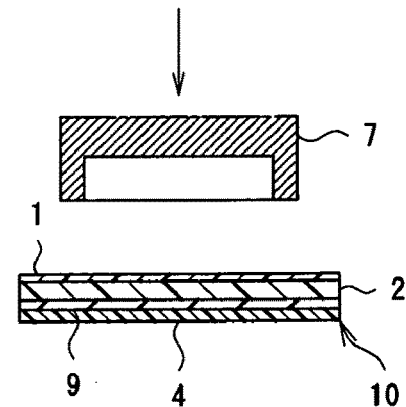
Figure 9A:
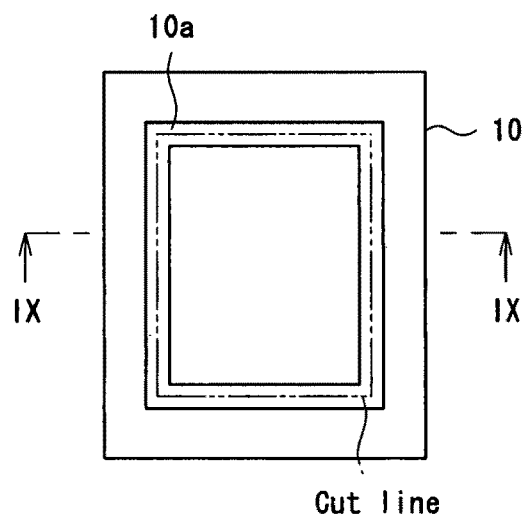
FIGS. 9A and 9B are explanatory views illustrating a process for manufacturing the decorative sheet C1 of the present invention, of which FIG: 8A is a plan view of a laminate sheet.
Figure 9B:
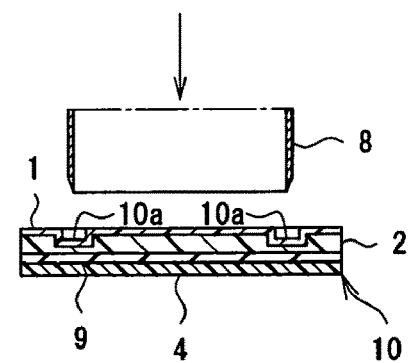

A method of manufacturing the decorative sheet C1 is described with reference to the drawings. The respective materials of the skin layer 1, the foam layer 2, and the elastic layer 9 are formed into sheets, and then those layers and the base material sheet 4 are stacked and fixed together through laminating operation to thereby obtain a large-sized laminate sheet 10 (FIG. 8A). Next, by using heat press-fitting or ultrasonic fusion-bonding, the jig 7 is pressed against the large-sized laminate sheet 10 from the skin layer 1 side (FIG. 8B), and the foam layer 2 is compressed so as to be crushed in the thickness direction to thereby form a bottomed annular groove portion 10a (FIG. 9A). Then, the cutter 8 is applied to the bottom surface of the annular groove portion 10a (FIG. 9B) to perform stamping on the laminate sheet 10 in the thickness direction, thereby obtaining the decorative sheet C1.

The effects of the decorative sheet C1 are described. In the decorative sheet C1, it is possible to attain the same effects as those of the decorative sheet B1; further, due to the provision of the elastic layer 9, which interferes the conductance of heat and pressure to the soft feel layer 3 from the base material sheet 4 side, it is possible to diminish the influence of heat and pressure applied from the back surface side to the soft feel layer 3 stacked on the external surface side of the decorative sheet C1. For example, when performing insert molding to form a molded body in which the decorative sheet C1 and a resin molding are integrated with each other, the decorative sheet C1 is positioned such that the soft feel layer 3 is held in contact with the mold surface; then, molten resin injected into the mold impinges upon the base material sheet 4, and the heat and pressure of this molten resin is received by the base material sheet 4. The heat and pressure received by the base material sheet 4 are not easily conducted to the soft feel layer 3 due to the buffering by the elastic layer 9, so it is possible to diminish the influence of the heat and pressure received by the foam layer 2 constituting the back surface side of the soft feel layer 3. When the influence of the heat and pressure received by the foam layer 2 is small, the foam layer 2 is not easily crushed, thus making it possible to restrain loss of the soft touch feeling.

The elastic layer 9 exhibits a distorting phenomenon, making it possible to enhance the effect of buffering the pressure received. Thus, it is possible to diminish the influence of the pressure received by the foam layer 2, making it hard for the foam layer 2 to be crushed. Thus, it is possible to restrain loss of the soft touch feeling.

Figure 7B:
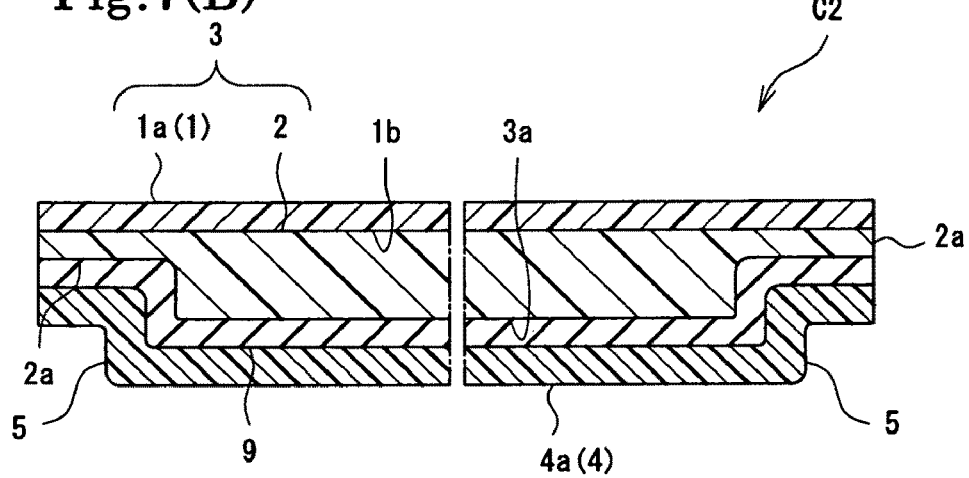

Decorative Sheet C2: As shown in FIG. 7B, the decorative sheet C2 differs from the decorative sheet C1 in the construction of the respective edge portions of the soft feel layer 3, the elastic layer 9, and the base material sheet 4. The residual construction and effects are the same as those of the decorative sheet C1.

Figure 32B:
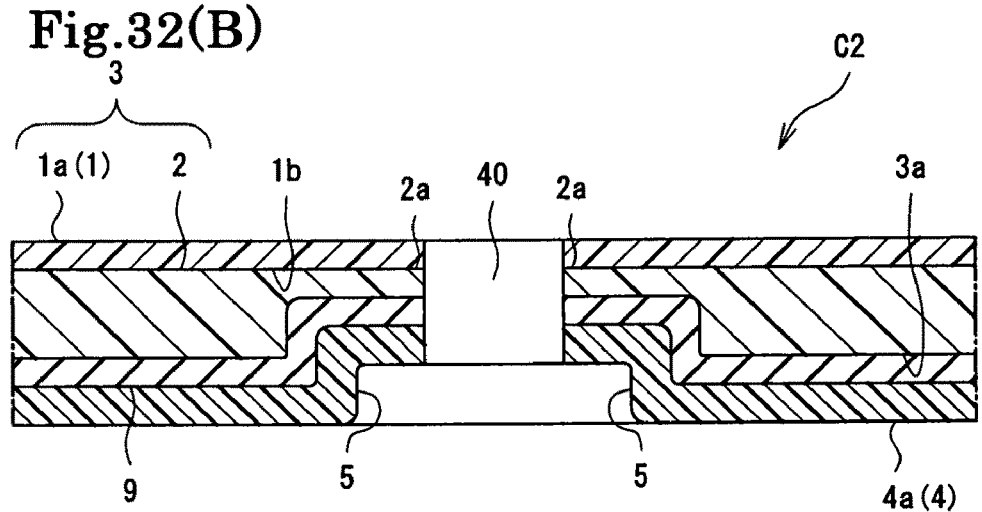

As in the case of the decorative sheet C1, the soft feel layer 3 has the function of providing a soft touch feeling, and the base material sheet 4 has, while being in the form of a film, the function of imparting undeformability to the decorative sheet C2. Further, also at the edge portion of the decorative sheet C2, the compressed portion 2a is formed by crushing the foam layer 2 in the thickness direction; however, unlike the decorative sheet C1, as a result of the formation of the compressed portion 2a, the step surface 5 is provided on the back surface 4a on the base material sheet 4 side as a result of the formation of the compressed portion 2a. Further, it is possible to provide the through-hole 40 extending through the thickness of the soft feel layer 3, that of the base material sheet 4, and that of the elastic layer 9. As shown in FIG. 32B, the compressed portion 2a is also formed at the edge portion of the through-hole 40.

A method of manufacturing the decorative sheet C2 is described. As in the case of the decorative sheet C1, the respective materials of the skin layer 1, the foam layer 2, and the elastic layer 9 are formed into sheets, and then those layers and the base material sheet 4 are stacked and fixed together through laminating operation to thereby obtain the large-sized laminate sheet 10. Next, by using heat press-fitting or ultrasonic fusion-bonding, the jig 7 is pressed against the large-sized laminate sheet 10 from the base material sheet 4 side, and the foam layer 2 is compressed so as to be crushed in the thickness direction to thereby form a bottomed annular groove portion. Then, the cutter 8 is passed from the skin layer 1 side toward the bottom surface of the annular groove portion to perform stamping on the laminate sheet 10 in the thickness direction, thereby obtaining the decorative sheet C2.

Figure 7C:
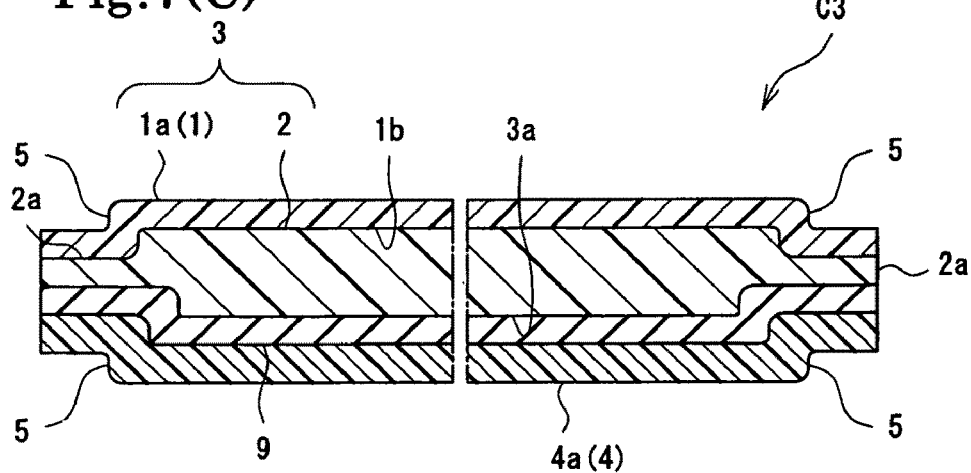

Decorative Sheet C3: As shown in FIG. 7C, the decorative sheet C3 differs from the decorative sheet C1 in the construction of the respective edge portions of the soft feel layer 3, the elastic layer 9, and the base material sheet 4. The residual construction and effects are the same as those of the decorative sheet C1.

Figure 32C:
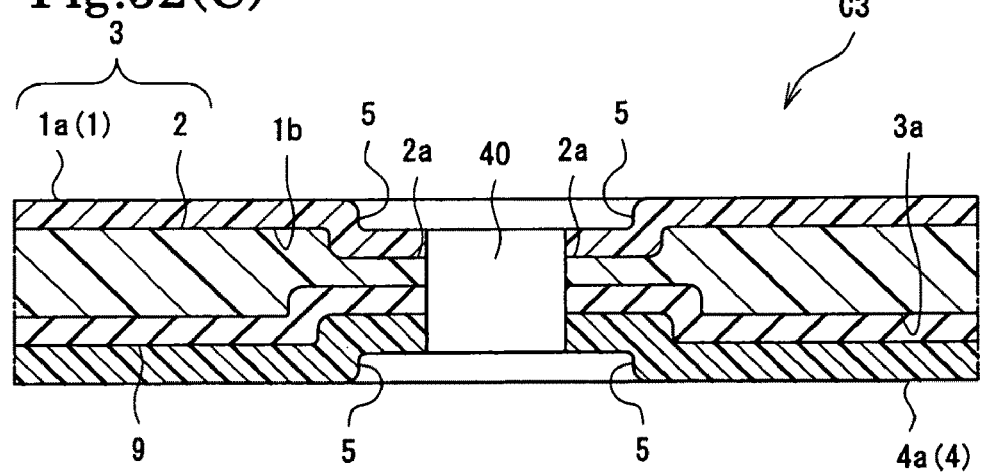

As in the case of the decorative sheet C1, the soft feel layer 3 has the function of providing a soft touch feeling, and the base material sheet 4 has, while being in the form of a film, the function of imparting undeformability to the decorative sheet C3. Further, also at the edge portion of the decorative sheet C3, the compressed portion 2a is formed by crushing the foam layer 2 in the thickness direction; however, unlike the decorative sheet C1, as a result of the formation of the compressed portion 2a, the decorative sheet C3 has the step surfaces 5 provided on both the external surface 1a of the skin layer 1 side and the back surface 4a on the base material sheet 4 side. Further, it is possible to provide the through-hole 40 extending through the thickness of the soft feel layer 3, that of the base material sheet 4, and that of the elastic layer 9. As shown in FIG. 32C, the compressed portion 2a is also formed at the edge portion of the through-hole 40.

A method of manufacturing the decorative sheet C3 is described. As in the case of the decorative sheet C1, the respective materials of the skin layer 1, the foam layer 2, and the elastic layer 9 are formed into sheets, and then those layers and the base material sheet 4 are stacked and fixed together by laminating operation to thereby obtain the large-sized laminate sheet 10. Next, by using heat press-fitting or ultrasonic fusion-bonding, the jig 7 is pressed against the large-sized laminate sheet 10 from both the skin layer 1 side and the base material sheet 4 side, and the foam layer 2 is compressed so as to be crushed in the thickness direction to thereby form bottomed annular groove portions. Then, the cutter 8 is passed from the bottom surface of the annular groove portion on one side toward the bottom surface of the annular groove portion on the other side to perform stamping on the laminate sheet 10 in the thickness direction, thereby obtaining the decorative sheet C3.

Embodiments of Decorative Molded Body (FIGS. 10 through 15): By using the decorative sheet as described above, the decorative molded body can be realized in the forms as shown in FIGS. 10 through 15.

Figure 10:
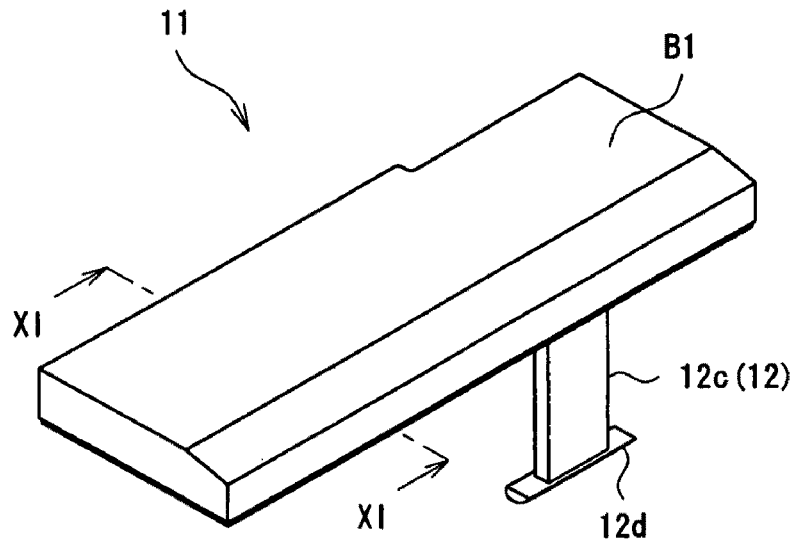
FIG. 10 is a perspective view of a decorative molded body according to a first embodiment.
Figure 11:
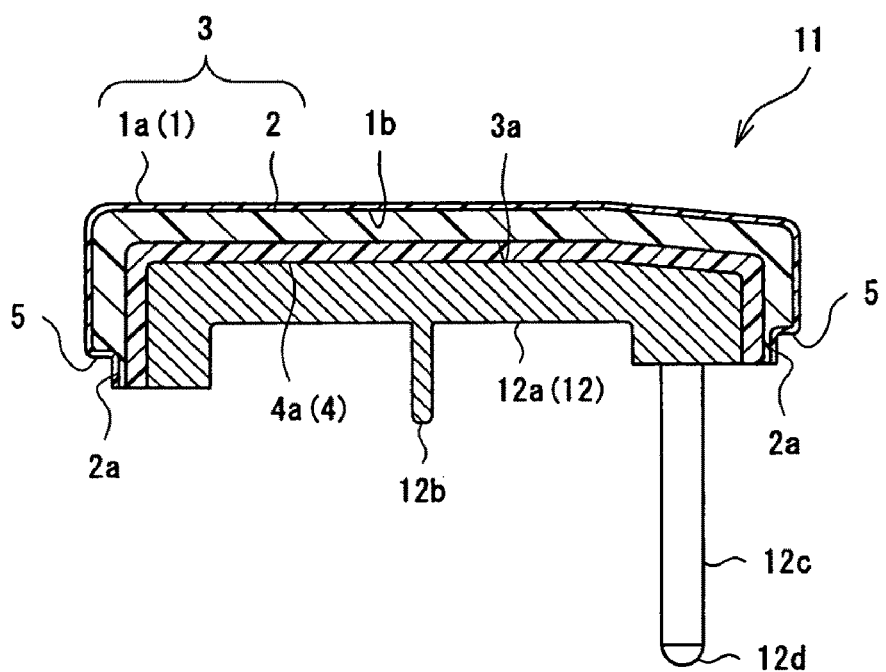
FIG. 11 is a sectional view taken along the line XI-XI of FIG. 10.

First Embodiment (FIGS. 10 and 11): FIGS. 10 and 11 show a decorative molded body 11 according to a first embodiment of the present invention. The decorative molded body 11 serves as a cover member 11 to be attached to a mobile phone or the like to cover an external connection terminal; FIG. 10 is a perspective view of the cover member 11, and FIG. 11 is a sectional view of the cover member 11. The cover member 11 of the first embodiment of the present invention is equipped with the decorative sheet B1 and a cover main body 12 serving as a "core member".

As described above, the decorative sheet B1 is equipped with the soft feel layer 3 having the skin layer 1 and the foam layer 2, and the base material sheet 4, with the base material sheet 4 being stacked on the back surface 3a of the soft feel layer 3. Further, at the edge portion of the decorative sheet B1, the compressed portion 2a is formed by crushing the foam layer 2 in the thickness direction, and, as a result of the formation of the compressed portion 2a, the step surface 5 is provided on the external surface 1a on the skin layer 1 side. In the decorative sheet B1, the back surface 4b of the base material sheet 4 is fixed to the front surface of the cover main body 12 described below.

The cover main body 12 is formed as a thin rectangular flat plate. On the back surface thereof opposed to an external connection terminal (not shown), there is formed a recess 12a, and, substantially at the center of the recess 12a, there is formed an engagement protrusion 12b to be engaged with the external connection terminal. Further, a mounting protrusion 12c for mounting the cover member 11 to a casing (not shown) protrudes in the same direction as the engagement protrusion 12b, and a detachment preventing portion 12d is provided at the distal end of the mounting protrusion 12c so that the cover member 11 may not be easily detached.

For the cover main body 12 serving as the core member, it is possible to use a material formed of a thermoplastic elastomer that can be fixed to the base material sheet 4. Examples of the thermoplastic elastomer include olefin-based thermoplastic elastomer, styrene-based thermoplastic elastomer, ester-based thermoplastic elastomer, and urethane-based thermoplastic elastomer.

A method of manufacturing the cover member 11 is described. First, by using a mold or a jig, pre-forming is performed on the decorative sheet B1 so that it may assume the same configuration as the surface of the cover main body 12. Next, insertion is effected such that the skin layer 1 of the decorative sheet B1 comes into contact with the cavity surface of the mold for the cover main body 12, and the mold is closed. After that, thermoplastic elastomer is injected into the cavity for forming the cover main body 12 to form the cover main body 12. At this time, the molten resin impinges upon the base material sheet 4 of the decorative sheet B1 and is fixed thereto. Finally, the mold is opened, and the cover member 11 formed by integrally molding the decorative sheet B1 and the cover main body 12 can be obtained as the decorative molded body 11.

The effect of the cover member 11 is described. In the cover member 11, the decorative sheet B1 is provided on the cover main body 12, so it is possible to maintain a soft touch feeling, making it possible to realize the cover member 11 of high durability. While in the first embodiment of the present invention the decorative sheet B1 is used, it is also possible to use, instead of the decorative sheet B1, any one of the decorative sheets A1 through A3, B2, B3, and C1 through C3.

Figure 12:
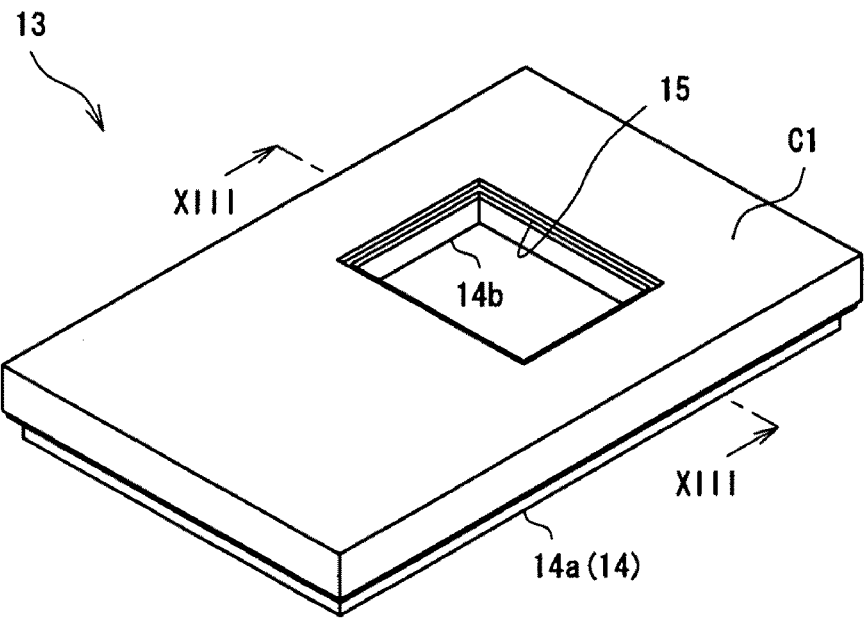
FIG. 12 is a perspective view of a decorative molded body according to a second embodiment of the present invention.
Figure 13:
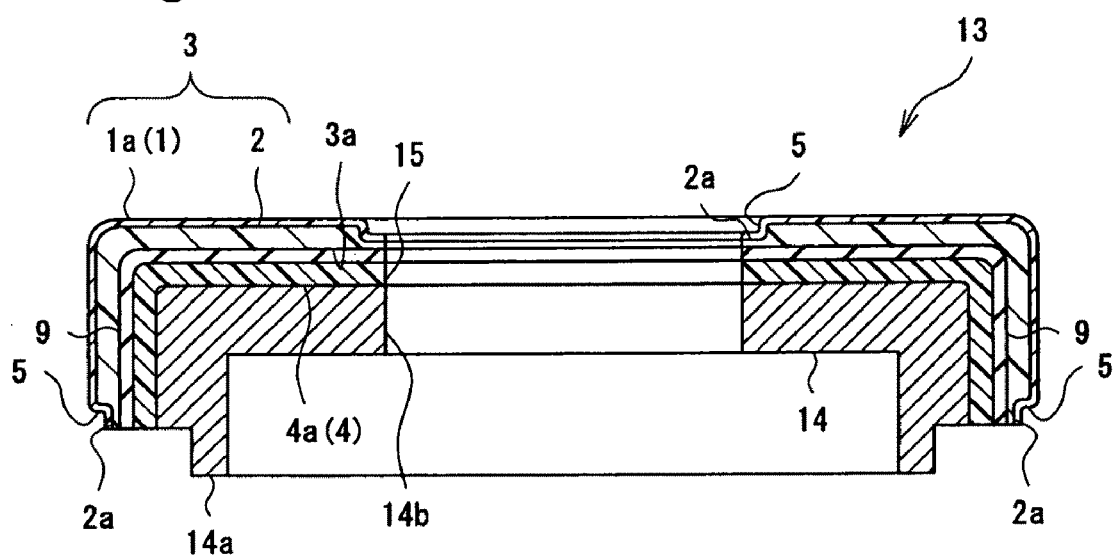
FIG. 13 is a sectional view taken along the line XIII-XIII of FIG. 12.

Second Embodiment (FIGS. 12 through 15): FIGS. 12 through 15 show a decorative molded body 13 according to a second embodiment of the present invention. The decorative molded body 13 is a casing 13 for a mobile phone or the like; FIG. 12 is a perspective view of the casing 13, and FIG. 13 is a sectional view of the casing 13. The casing 13 of the second embodiment of the present invention is provided with a decorative sheet C1 and a resin molded body 14 serving as the "core member".

As described above, the decorative sheet C1 is provided with the soft feel layer 3 having the skin layer 1 and the foamed layer 2, the elastic layer 9, and the base material sheet 4; the elastic layer 9 is stacked on the back surface 3a of the soft feel layer 3, and the base material sheet 4 is stacked on the back surface 9b of the elastic layer 9 in this order. In the decorative sheet C1, there is formed a through-hole 15 rectangular in plan view passing through the thickness of the soft feel layer 3, the elastic layer 9, and the base material sheet 4. At the outer edge portion of the decorative sheet C1 and at the hole edge portion of the through-hole 15, the compressed portions 2a are formed by crushing the foam layer 2 in the thickness direction, and, as a result of the formation of the compressed portions 2a, the step portions 5 are provided on the external surface 1a on the skin layer 1 side. In the decorative sheet C1, the back surface 4b of the base material sheet 4 is fixed to the front surface of the casing 13 described below.

The resin molded body 14 is formed of a thermoplastic resin, and is formed as a shallow rectangular container. At the edge of the resin molded body 14, there is provided an annular protrusion 14a to be engaged with a resin molded body (not shown); at the bottom thereof, there is provided a through-hole 14b forming a through-hole together with the through-hole 15 of the decorative sheet C1.

For the resin molded body 14 serving as the core member, it is possible to use a material formed of a thermoplastic resin that can be fixed to the base material sheet 4. Examples of the thermoplastic resin, for example, include a polyethylene resin, a polypropylene resin, a polystyrene resin, a polyethylene-terephthalate resin, a polybutylene-terephthalate resin, an acrylonitrile-styrene-acrylate resin, an acrylonitrile-butadiene-styrene resin, a polymethyl methacrylate resin, a polymethacrylate resin, a polycarbonate resin, a polyamide resin, a polyphenylene oxide resin, a polyether ether ketone resin, a polyphenylene sulfide resin, and a polyphenylene ether resin.

A method of manufacturing the casing 13 is described with reference to the drawings. First, the skin layer 1, the foam layer 2, the elastic layer 9, and the base material sheet 4 are stacked and fixed together by laminating operation to thereby obtain the large-sized laminate sheet 10 (FIG. 14A). Next, by using heat press-fitting or ultrasonic fusion-bonding, the jig 7 is pressed against the large-sized laminate sheet 10 from the skin layer 1 side (FIG. 14B), and the foam layer 2 is compressed so as to be crushed in the thickness direction to thereby form the bottomed annular groove portion 10a (FIG. 15A). Then, the cutter 8 is applied to the bottom surface of the annular groove portion 10a (FIG. 15B) to perform stamping on the laminate sheet 10 in the thickness direction, thereby obtaining the decorative sheet C1 provided with the through-hole 15. Pre-forming is performed on the decorative sheet C1 by using a mold or a jig such that the decorative sheet C1 assumes the same surface configuration as the resin molded body 14. Next, insertion is effected such that the skin layer 1 of the decorative sheet C1 comes into contact with the cavity surface of the mold for the resin molded body 14, and the mold is closed. After that, a thermoplastic resin is injected into the cavity for forming the resin molded body 14 to form the resin molded body 14. At this time, the molten resin impinges upon the base material sheet 4 of the decorative sheet C1 and is fixed thereto. Finally, the mold is opened, and the casing 13 formed by integrally molding the decorative sheet C1 and the resin molded body 14 can be obtained as the decorative molded body 13.

The effects of the casing 13 are described. As in the case of the cover member 11 of the first embodiment of the present invention, in the casing 13, the decorative sheet C1 is provided on the surface of the resin molding 14, so it is possible to maintain the soft touch feeling and to realize the casing 13 of high durability. While in the second embodiment of the present invention the decorative sheet C1 is used, it is also possible to use, instead of the decorative sheet C1, any one of the decorative sheets A1 through A3, B1 through B3, C1, and C2.

Embodiments of Decorative Key Sheet (FIGS. 16 through 27): By using the decorative sheet as described above, the decorative key sheet can be realized in the forms as shown in FIGS. 16 through 27.

Figure 16:
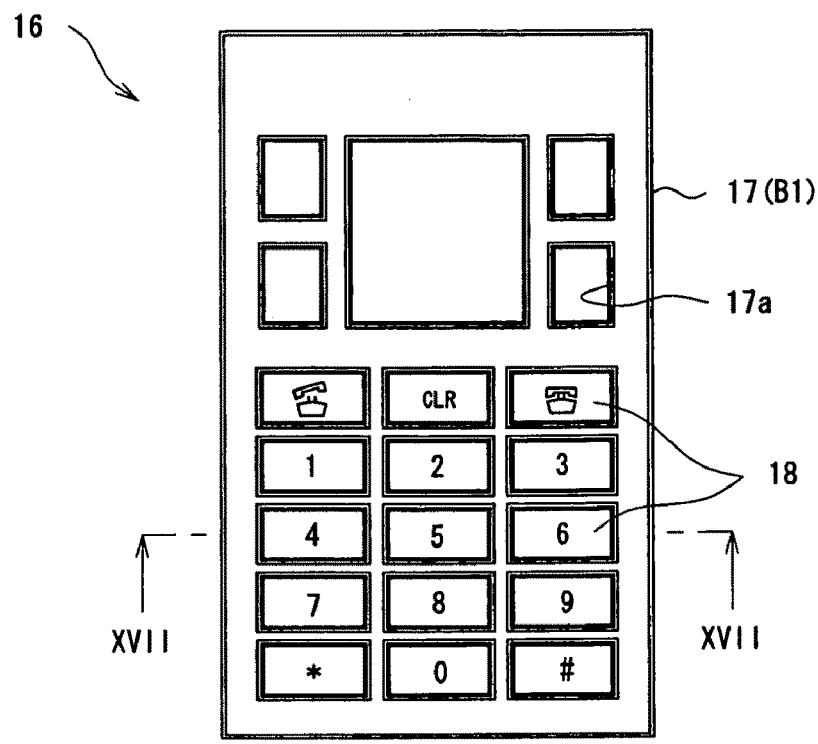
FIG. 16 is a plan view of a decorative key sheet according to a first embodiment of the present invention.
Figure 17:
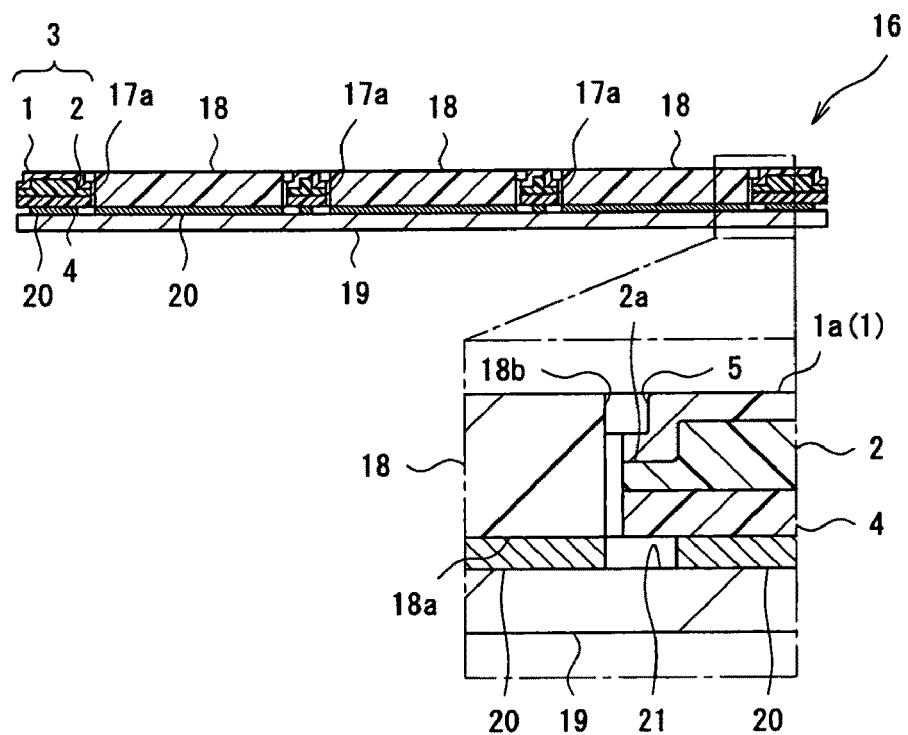
FIG. 17 is a sectional view taken along the line XVII-XVII of FIG. 16.
Figure 18:
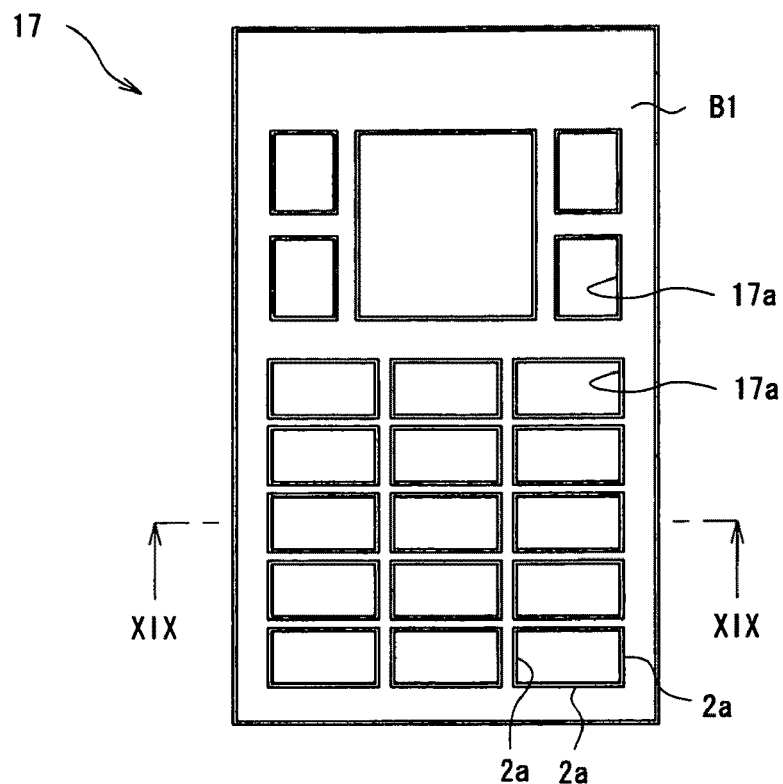
FIG. 18 is a plan view of the decorative sheet B1 to be used in the decorative key sheet of the first embodiment of the present invention.
Figure 19:
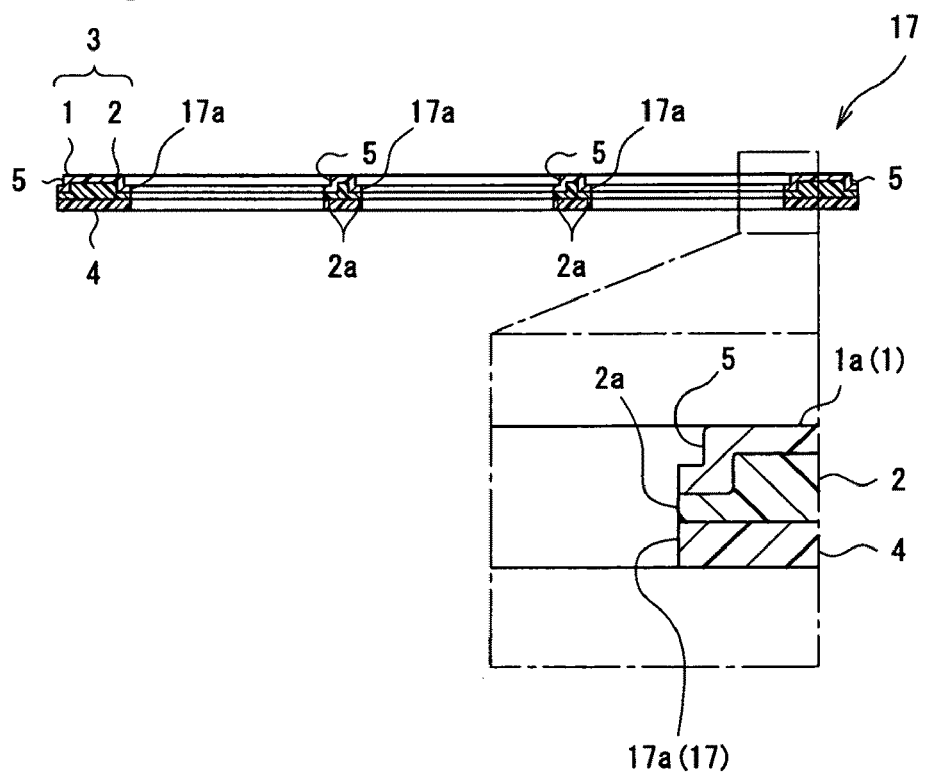
FIG. 19 is a sectional view taken along the line XIX-XIX of FIG. 18.

First Embodiment (FIGS. 16 through 19): FIGS. 16 through 19 show a decorative key sheet 16 according to the first embodiment of the present invention. FIG. 16 is a plan view of the decorative key sheet 16, FIG. 17 is a sectional view of the decorative key sheet 16, FIG. 18 is a plan view of a frame sheet 17 formed by the decorative sheet B1, and FIG. 19 is a sectional view of the frame sheet 17. The decorative key sheet 16 of the first embodiment of the present invention is equipped with the frame sheet 17, key tops 18, a base sheet 19, and a print bonding layer 20.

The frame sheet 17 is formed by the decorative sheet B1 described above, which is formed in a rectangular configuration in plan view. The frame sheet 17 is equipped with the soft feel layer 3 having the skin layer 1 and the foam layer 2, and the base material sheet 4, with the base material sheet 4 being stacked on the back surface 2a of the foam layer 2. In the frame sheet 17, there are formed a plurality of through-holes 17a rectangular in plan view extending through the thickness of the soft feel layer 3 and that of the base material sheet 4. At the outer edge portion of the frame sheet 17 and the hole edge portions of the through-holes 17a, there are formed the compressed portions 2a by crushing the foam layer 2 in the thickness direction, and, as a result of the formation of the compressed portions 2a, the step surface 5 is formed on the external surface 1a on the skin layer 1 side. Due to the demand for a reduction in thickness, it is desirable for the thickness of the frame sheet 17 to be approximately 0.2 mm to 0.5 mm.

The key tops 18 are formed in a rectangular configuration in plan view, and are arranged within the through-holes 17a of the frame sheet 17. From the viewpoint of harmony with the height of the frame sheet 17, the thickness of the key tops 18 preferably ranges from approximately 0.2 mm to 0.6 mm.

The base sheet 19 has a rectangular configuration similar to that of the frame sheet 17. The base sheet 19 serves as a base portion which maintains the configuration of the decorative key sheet 16 and on whose surface the frame sheet 17 and the key tops 18 are placed. When the key tops 18 are depressed, they are slightly distorted, and press contacts provided on a board (not shown) on the back surface side of the base sheet 19. It is also possible to provide pusher-like swellings at the portions of the back surface of the base sheet 19 pressing the contacts (not shown). Due to the demand for a reduction in thickness, the thickness of the base sheet 19 is preferably 150 µm or less, and more preferably, 50 µm or less.

The print adhesive layers 20 are adhesive layers for bonding together the frame sheet 17, the key tops 18, and the base sheet 19; they are formed by printing. The print adhesive layers 20 are formed of a material that is softened or melted through heating. As shown in FIG. 17, the print adhesive layers 20 which exist between the key tops 18 and the base sheet 19 are provided over the entire bottom surfaces 18a of the key tops 18, and are formed so as to be flush with the side surfaces 18b of the key tops 18. On the other hand, the print adhesive layers 20 provided between the frame sheet 17 and the base sheet 19 are not provided up to the edges of the frame sheet 17 adjacent to the key tops 18. Thus, no print adhesive layer 20 exists at the edges of the frame sheet 17 adjacent to the key tops 18, and there is generated a gap portion 21 where the frame sheet 17 and the base sheet 19 are not fixed to each other. Then, the gap portion 21 constitutes a non-constraint region where the base sheet 19 is not constrained by the frame sheet 17.

The material of the key tops 18 is a hard resin such as a thermosetting resin or a thermoplastic resin. As the thermosetting resin, for example, a urethane resin, an epoxy resin, or a silicone resin may be used, and as the thermoplastic resin, a polycarbonate resin, an acrylonitrile-butadiene-styrene resin, an acrylic resin, a polyester resin, or a polybutylene-terephthalate resin, and further alloy resins thereof may be used.

The material of the base sheet 19 is a resin film, and, for example, there may be used are a polyethylene-terephthalate resin film, a polybutylene-terephthalate resin film, a polyurethane resin film, a polyamide resin film, a polypropylene resin film, a polystyrene resin film, a fluororesin film, an ionomer resin film, a polycarbonate resin film, or a polyvinyl chloride resin film.

As the material of the print adhesive layers 20, one that is softened or melted through heating can be used. Examples of the material include a resin of acrylic type, vinyl chloride type, polyester type, or urethane type, wax, and rubber. The ink for print formation is one which exhibits fluidity enough to allow printing at the time of coating and maintains a solid state thereafter; it is possible to use a solvent-diluted type ink dissolved or dispersed in solvent, or an ink of the type which is obtained by fusing a substance that is solid at room temperature into liquid; from the viewpoint of accurate, fine printing on a predetermined bottom surface such as that of a key top 18, and due to the fact that the solvent is immediately evaporated after printing to leave a solid substance, thus maintaining the printed form, it is desirable to adopt a solvent-diluted type ink. Above all, from the viewpoint of suppressing sagging and deformation of the print adhesive layers 20 in the bonding step due to heating and pressurization, the type of ink which is softened by heating is more preferable than the type of ink which is melted by heating.

A method of manufacturing the decorative key sheet 16 is described. First, the skin layer 1, the foam layer 2, and the base material sheet 4 are stacked and fixed together to prepare a laminate sheet 6, and, by using heat press-fitting or ultrasonic fusion-bonding, a bottomed annular groove portion is formed on the skin layer 1 side of the laminate sheet 6; then, the cutter 8 is applied to the bottom surface of the annular groove portion to perform stamping, thereby obtaining the frame sheet 17 (decorative sheet B1) provided with the through-holes 17a. Next, characters, symbols, etc. are formed on the key tops 18, and then the print adhesive layers 20 are formed on the frame sheet 17 and the key tops 18 by screen printing, pad printing, relief printing, gravure printing, or the like. After that, positioning is performed on the frame sheet 17 and the key tops 18 with respect to the base sheet 19, and predetermined regions are heated and pressurized from the base sheet 19 side by a thermocompression bonding machine or the like, whereby the base sheet 19, the frame sheet 17, and the key tops 18 are bonded together. In this way, the decorative key sheet 16 can be obtained. The heating and pressing conditions vary according to the material of the print adhesive layers 20, the thickness of the print adhesive layers 18, the thickness of the base sheet 19, etc.; the surface temperature of the pressed portion ranges from 120° C. to 220° C., and more preferably, from 140° C. to 170° C.; the pressing time ranges from 1 second to 20 seconds, and more preferably, from 5 seconds to 10 seconds; the pressure is in the range of 30 kg to 500 kg/20 to 25 cm$^2$, and more preferably, in the range of 50 kg to 300 kg/20 to 25 cm$^2$.

The effects of the decorative key sheet 16 are described. In the decorative key sheet 16, the decorative sheet B1 is used as the frame sheet 17, so it is possible to provide a frame sheet 17 capable of maintaining a soft touch feeling, making it possible to realize a decorative key sheet 16 of high durability. Further, there are provided the base sheet 19 formed of a resin film, the key tops 18 arranged on the base sheet 19, and the print adhesive layers 20, so it is possible to realize a thin decorative key sheet 16. Then, thanks to the print adhesive layers 20, it is possible to accurately control the fixation positions for the key tops 18 and the base sheet 19, and the coating thickness, making it possible to provide a thin decorative key sheet 16 in which the key tops 18 are fixed so as not to be easily detached. In particular, due to the provision of the frame sheet 17 between the key tops 18, it is possible to realize a thin decorative key sheet 16 in which a nail tip is not easily allowed to enter the gaps between the key tops 18 and the base sheet 19 so that the key tops 18 are not easily detached.

Figure 20:
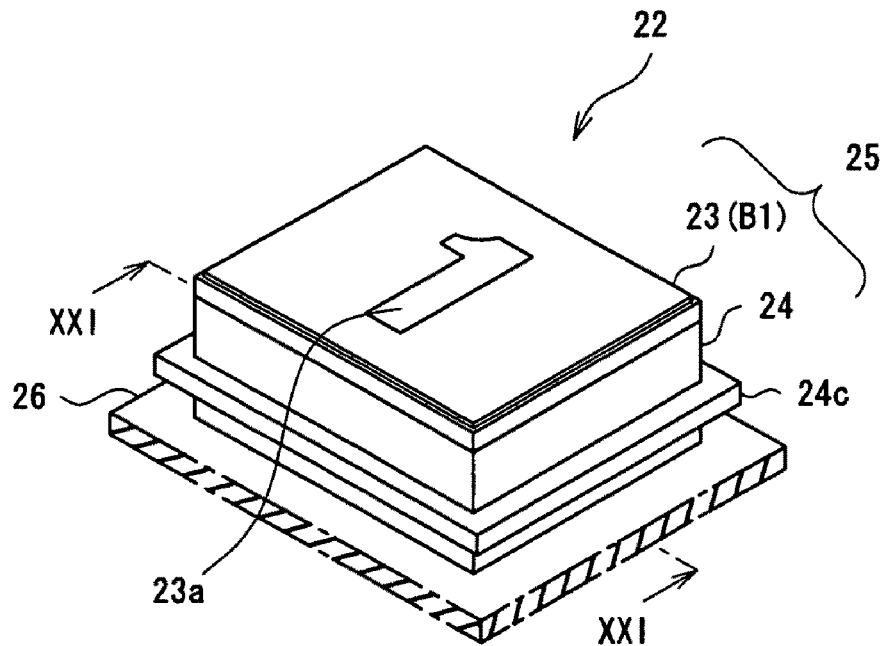
FIG. 20 is an enlarged partial perspective view of a decorative key sheet according to a second embodiment of the present invention.
Figure 21:
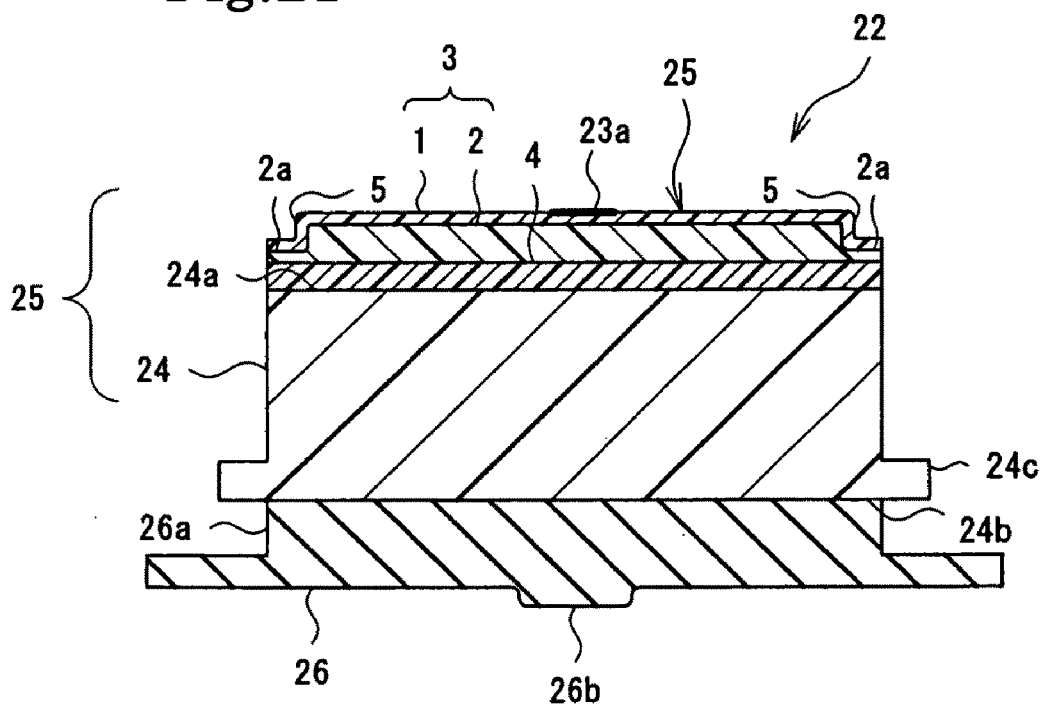
FIG. 21 is a sectional view taken along the line XXI-XXI of FIG. 20.
Figure 22:
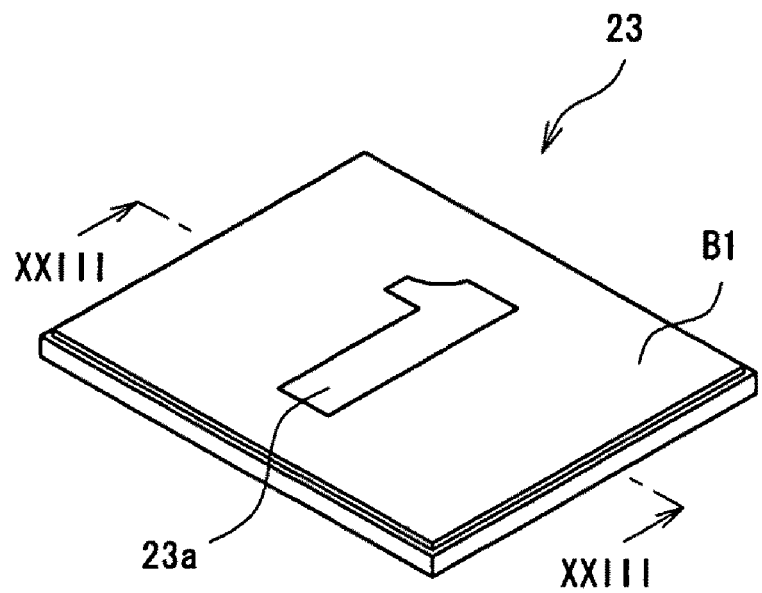
FIG. 22 is a perspective view of a decorative sheet to be used in the decorative key sheet of the second embodiment of the present invention.
Figure 23:
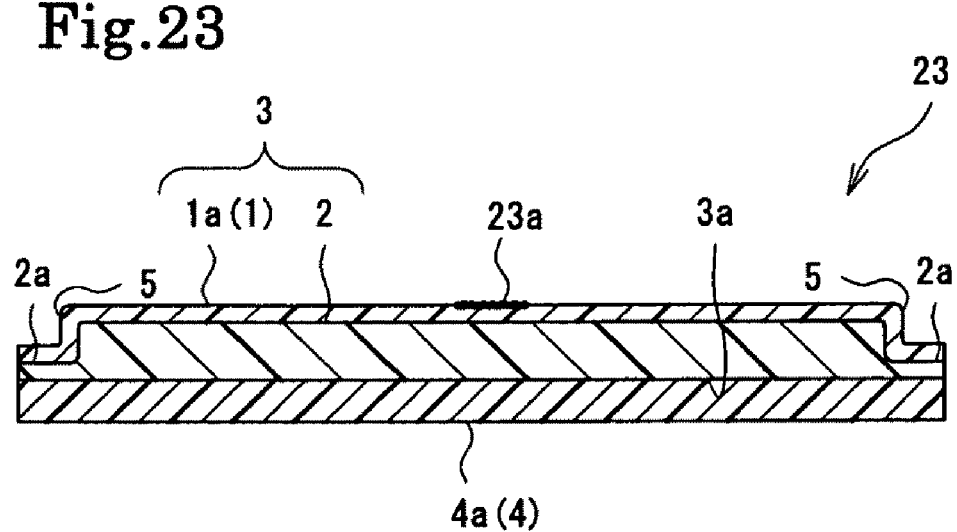
FIG. 23 is a sectional view taken along the line XXIII-XXIII of FIG. 22.

Second Embodiment (FIGS. 20 through 23): FIGS. 20 through 23 show a decorative key sheet 22 according to a second embodiment. FIG. 20 is an enlarged partial sectional view of the key sheet 22, FIG. 21 is a sectional view taken along the line XXI-XXI of FIG. 20, FIG. 22 is a perspective view of a display layer 23 formed by the decorative sheet B1, and FIG. 23 is a sectional view of the display layer 23. The decorative key sheet 22 of the second embodiment of the present invention is equipped with a key top 25 having the display layer 23 and a key top main body 24, and a base sheet 26.

The display layer 23 is formed by the decorative sheet B1 described above, which is formed in a rectangular configuration in plan view. That is, the display layer 23 is equipped with the soft feel layer 3 having the skin layer 1 and the foam layer 2, and the base material sheet 4, with the base material sheet 4 being stacked on the back surface 3a of the soft feel layer 3. Further, at the outer edge portion of the display layer 23, the compressed portion 2a is formed by crushing the foam layer 2 in the thickness direction, and, as a result of the formation of the compressed portion 2a, the step surface 5 is provided on the external surface 1a on the skin layer 1 side. A display portion 23a representing a figure, symbol, or the like (which is the figure "1" in the drawing) is formed on the display layer 23 by printing. The display layer 23 is fixed to an operating surface 24a of the key top main body 24 described below by an adhesive (not shown), thus forming the key top 25.

The key top main body 24 is formed in the same rectangular configuration in plan view as the display layer 23. Then, an outwardly protruding annular flange portion 24c is provided on the end portion on the back surface 24b side opposite to the operating surface 24a. The back surface 24b side of the key top main body 24 is fixed to the base sheet 26 described below by an adhesive (not shown).

The base sheet 26 is a base portion on which the key top 25 is disposed. On the operating surface side of the base sheet 26, there is formed a pedestal portion 26a as a swollen portion to which the key top 25 is fixed. On the back surface on the side opposite to the operating surface, there is formed for each pedestal portion 26a a pusher portion 26b protruding in the depressing direction and pressing a contact provided on a board (not shown).

The key top main body 24 is formed of a hard resin such as a thermoplastic resin. Examples of the hard resin include a polycarbonate resin, an acrylonitrile butadiene styrene resin, an acrylic resin, a polyester resin, a polybutylene terephthalate resin, and an alloy resin of those resins.

The base sheet 26 is formed of a rubber-like elastic material of high resiliency. For example, silicone rubber, acrylic rubber, ethylene-propylene rubber, natural rubber, isoprene rubber, butadiene rubber, styrene-based thermoplastic elastomer, olefine-based thermoplastic elastomer, ester-based thermoplastic elastomer, and urethane-based thermoplastic elastomer may be used.

A method of manufacturing the decorative key sheet 22 is described. First, printing of the display portion 23a is performed on a skin layer of the decorative sheet B1 to obtain the display layer 23. Next, the coating layer 4 side of the display layer 23 is fixed to the operating surface 24a of the key top main body 24 formed by molding, thereby obtaining the key top 25. Finally, the back surface 24b of the key top main body 24 is fixed by an adhesive (not shown) to the pedestal portion 26a of the base sheet 26 formed by molding, thereby obtaining the decorative key sheet 22.

The effects of the decorative key sheet 22 are described. In the decorative key sheet 22, the display layer 23 formed of the decorative sheet B1 is provided on the surface of the key top 25, so it is possible to provide a key top 25 capable of maintaining a soft touch feeling, making it possible to realize a decorative key sheet 22 of high durability. Further, it is possible to impart a decoration of a different design to each key top 25, making it possible to realize a decorative key sheet 22 of a novel design.

Figure 24:
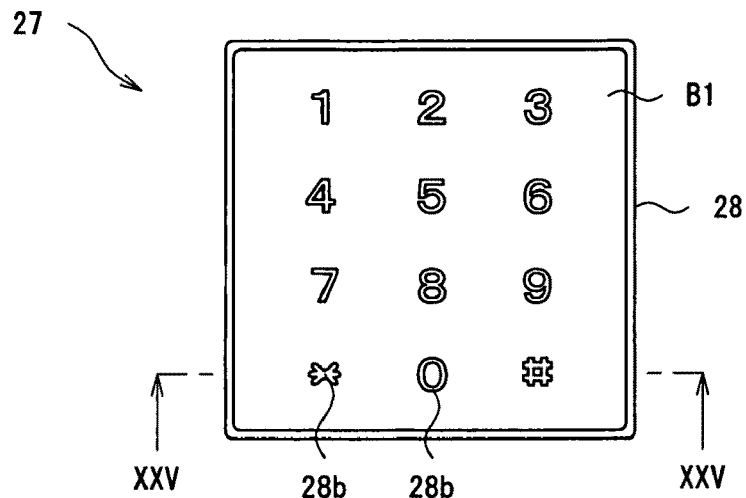
FIG. 24 is a plan view of a decorative key sheet according to a third embodiment of the present invention.
Figure 25:
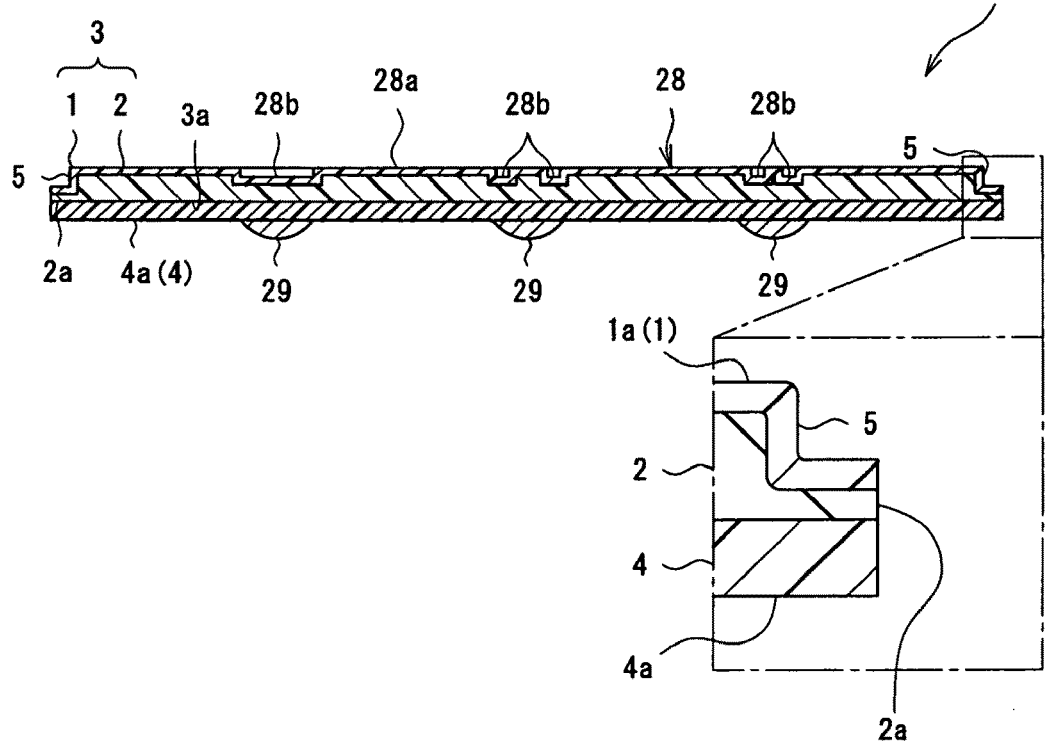
FIG. 25 is a sectional view taken along the line XXV-XXV of FIG. 24.

Third Embodiment (FIGS. 24 and 25): FIGS. 24 and 25 show a decorative key sheet 27 according to a third embodiment of the present invention. FIG. 24 is a plan view of an operation plate 28 formed by the decorative sheet B1, and FIG. 25 is a sectional view of an operation plate 28. The decorative key sheet 27 of the third embodiment of the present invention is equipped with the operation plate 28 and pushers 29.

The operation plate 28 is formed by the decorative sheet B1 described above, which is formed in a rectangular configuration in plan view. That is, the operation plate 28 is equipped with the soft feel layer 3 as the "frame sheet" having the skin layer 1 and the foam layer 2, and the base material sheet 4 as the "base sheet", with the base material sheet 4 being stacked on the back surface 2a of the foam layer 2. Further, at the outer edge portion of the operation plate 28, the compressed portion 2a is formed by crushing the foam layer 2 in the thickness direction, and, as a result of the formation of the compressed portion 2a, the step surface 5 is provided on the external surface 1a on the skin layer 1 side. On an operating surface 28a of the operation plate 28, there are formed display portions 28b in the form of bottomed "recesses" representing figures, symbols and so on, and the periphery of each of the display portions 28b constitutes a depressing operation portion.

The pushers 29 are formed of resin in a semi-spherical configuration. They are provided on the back surface 28c on the side opposite to the operating surface 28a of the operation plate 28, and protrude from the back surface 28c in a dome-like fashion in the depressing direction.

As the material of the pushers 29, it is possible to use a hard resin such as reaction setting type resin or thermoplastic resin. For example, it is desirable to adopt a photo reaction setting type liquid resin, such as an acrylic resin, an epoxy resin, or a urethane resin. By using such a resin, it is possible to easily form the pushers 29 through dripping or transfer to the back surface 28c of the operation plate 28.

A method of manufacturing the decorative key sheet 27 is described. First, a heated jig or stamp is pressed against the decorative sheet B1 to form the display portions 28b as the bottomed "recesses" representing figures, symbols and so on, thereby obtaining the operation plate 28 (the decorative sheet B1). At this time, the foam layer 2 is compressed to form the recesses of the display portions 28b. Finally, the pushers 29 are formed of liquid resin on the back surface 28c of the operation plate 28, thereby obtaining the decorative key sheet 27.

The effects of the decorative key sheet 27 are described. In the decorative key sheet 27, the decorative sheet B1 is used as the operation plate 28, so it is possible to provide an operating surface 28a capable of maintaining a soft touch feeling, making it possible to realize a decorative key sheet 25 of high durability.

No foam layer 2 is exposed in the recesses of the display portions 28b formed in the operation plate 28, so the foam layer 2 does not easily suffer breakage during use. Thus, it is possible to realize a decorative key sheet 25 of high durability.

The pushers 29 protruding from the back surface 28c of the operation plate 28 can properly press contacts (not shown), thus making it possible to realize a decorative key sheet 27 allowing reliable depressing operation.

Figure 26:
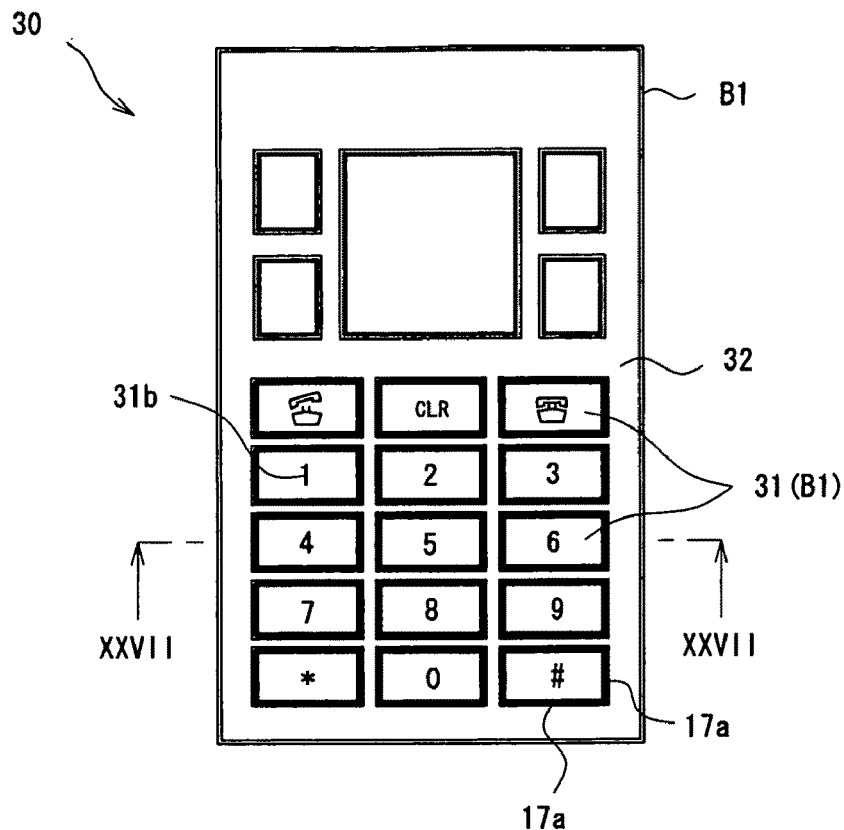
FIG. 26 is a plan view of a decorative key sheet according to a fourth embodiment of the present invention.
Figure 27:
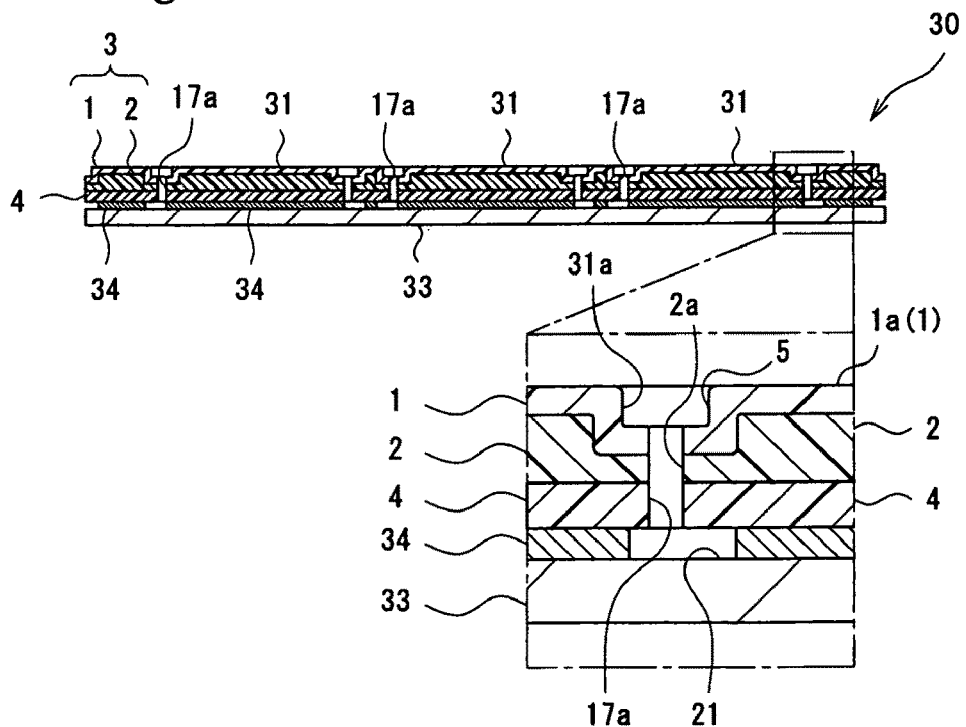
FIG. 27 is a sectional view taken along the line XXVII-XXVII of FIG. 26.

Fourth Embodiment (FIGS. 26 and 27): FIGS. 26 and 27 show a decorative key sheet 30 according to a fourth embodiment of the present invention. FIG. 26 is a plan view of the decorative key sheet 30, and FIG. 27 is a sectional view taken along the line XXVII-XXVII of FIG. 26. The decorative key sheet 30 of the fourth embodiment of the present invention differs from the decorative key sheet 17 of the first embodiment of the present invention in the construction of key tops 31.

That is, in the decorative key sheet 30, not only the frame portion but also the key top portions thereof are formed by the decorative key sheet B1 described above. In the decorative key sheet 16 of the first embodiment, there are provided the frame sheet 17 formed by the decorative sheet B1 and the key tops 18 separately formed of resin, whereas, in this embodiment, not only the frame sheet 32 but also the key tops 31 are formed by the decorative sheet B1. That is, a single decorative sheet B1 is processed into the frame sheet 32 and the key tops 31.

In the decorative key sheet 30, there is formed an annular division groove 31a of a rectangular configuration in plan view, constituting a boundary between the key tops 31 and the frame sheet 32. Further, display portions 31b representing figures, symbols and so on are formed on the surfaces of the key tops 31 by printing. On the side surface of the division groove 31a, there is formed the compressed portion 2a by crushing the foam layer 2 in the thickness direction, and, as a result of the formation of the compressed portion 2a, the step surface 5 is provided on the external surface 1a on the skin layer 1 side. From the viewpoint of harmony with the height of the frame sheet 32, the thickness of the key tops 31 preferably ranges from approximately 0.2 mm to 0.6 mm, and, due to the demand for a reduction in thickness, it preferably ranges from approximately 0.2 mm to 0.5 mm. A base sheet 33 formed of a thin film is fixed to the back surface of the decorative sheet B1 by a print bonding layer 34 formed by printing.

A method of manufacturing the decorative key sheet 30 is described. First, the division groove 31a formed of the compressed portion 2a is formed by heat press-fitting or ultrasonic fusion-bonding on the skin layer 1 side of the laminate sheet 6 formed by stacking and fixing together the skin layer 1, the foam layer 2, and the base material sheet 4. The display portions 31*b* representing characters, symbols, etc. are formed by printing on the key top portions 31 divided by the division groove 31*a*. Further, the print bonding layer 34 is provided on the back surface of the decorative sheet B1 in correspondence with the key tops 31 and the frame sheet 32 and is fixed to the base sheet 33. After this, the cutter 8 is applied to the bottom surface of the division groove 31*a* to thereby provide the through-hole 17*a* extending through the decorative sheet B1. In this way, the decorative key sheet 30 can be obtained.

The effects of the decorative key sheet 30 are described. In the key sheet 30, due to the use of the decorative sheet B1 as the key tops 31 and the frame sheet 32, it is possible for the key tops 31 and the frame sheet 32 to maintain a soft touch feeling, thus making it possible to realize a decorative key sheet 30 of novel design and high durability.

Modification Common to Embodiments: While in the decorative key sheets 16, 22, 27, and 30 the decorative sheet B1 is used, it is also possible to use any one of the decorative sheets A1 through A3, B2, B3, and C1 through C3. In particular, when any one of the decorative sheets B2, B3, C2, and C3 is used for the frame sheet of the decorative key sheet 16 of the first embodiment of the present invention, the gap portion 21 can be easily provided due to the presence of the step surface on the base material sheet 4 side.

EXAMPLES

Next, the present invention is described in more detail with reference to an example and a comparative example; the following description of the examples, however, should not be construed restrictively. Regarding the decorative sheet, the above-mentioned decorative sheet B1 is adopted as a typical example.

1. Production of Decorative Sheet

Example 1

Figure 28:
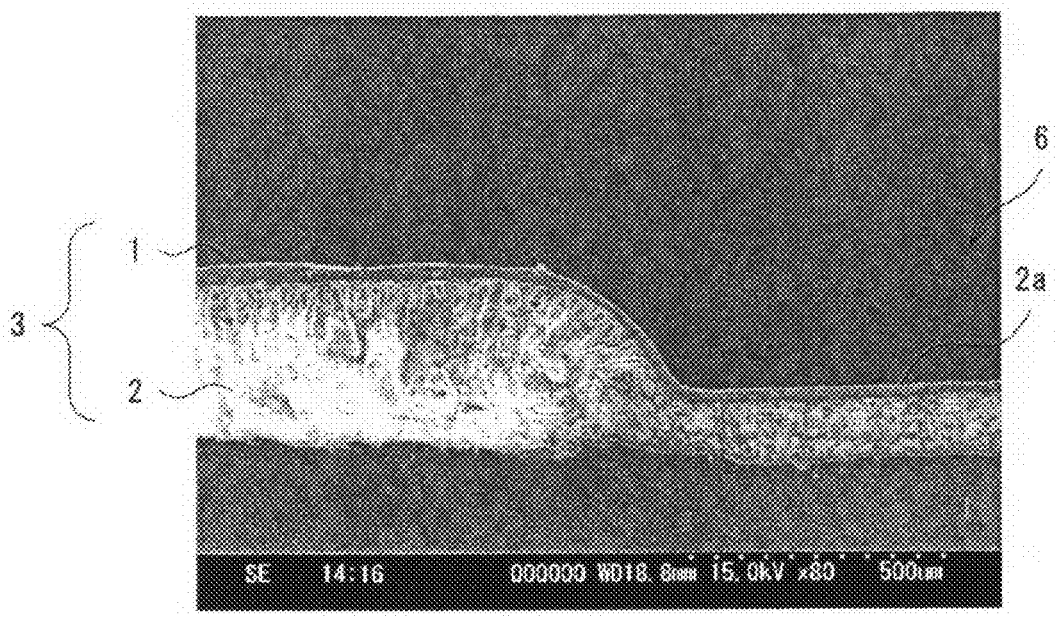
FIG. 28 is a scanning electron micrograph showing an edge portion of a decorative sheet according to examples of the present invention.
Figure 29:
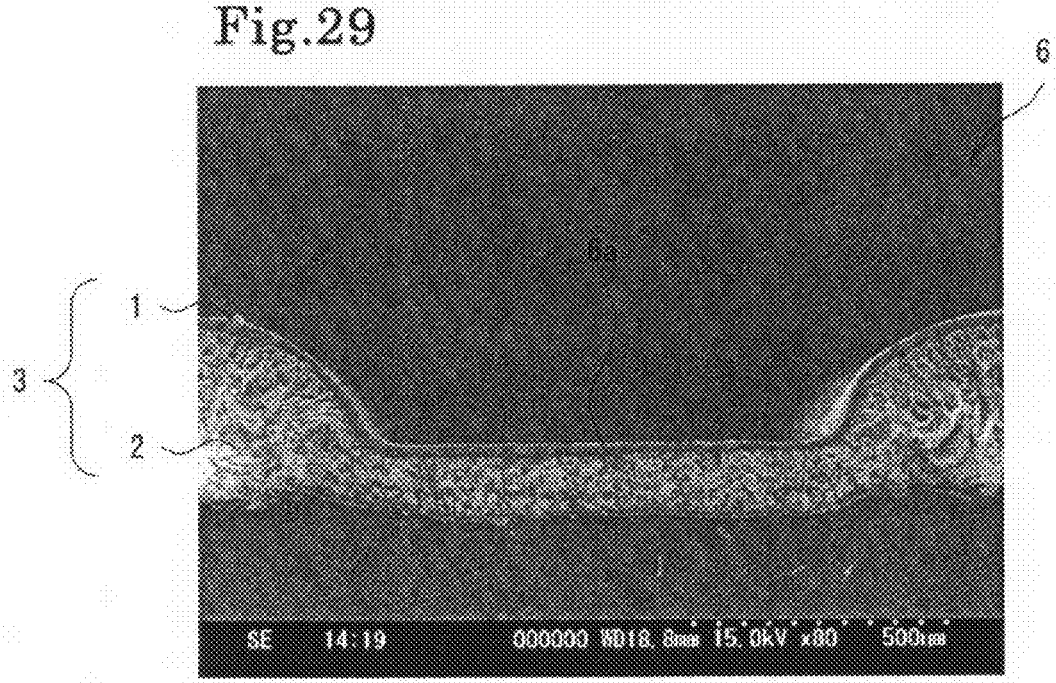
FIG. 29 is a scanning electron micrograph showing a section of the decorative sheet of examples of the present invention during the manufacturing for the same.

Lamination processing was performed on an urethane film having a thickness of 30 μm and serving as the skin layer (1) and on an urethane foam body having a thickness of 350 μm and serving as the foam layer (2), thereby obtaining the soft feel layer (3). Further, a polyethylene terephthalate film having a thickness of 125 μm was provided by performing lamination processing on the foam layer (2) side of the soft feel layer (3) as the base material sheet (4), thereby producing the laminate sheet (6). Next, by using ultrasonic fusion-bonding, the ultrasonic jig (7) was pressed against the laminate sheet (6) from the skin layer (1) side, and the bottomed annular groove portion (6*a*) was formed by compressing the foam layer (2) so as to crush it in the thickness direction. Then, the cutter (8) was applied to the bottom surface of the annular groove portion (6*a*) to perform stamping on the laminate sheet (6) in the thickness direction, thereby producing the decorative sheet (B1) of Specimen 1 having the compressed portion (2*a*) at the outer edge thereof. FIG. 28 is a scanning electronic micrograph of a section of Specimen 1. FIG. 29 is a scanning electronic micrograph of a section of the annular groove portion (6*a*); as can be seen from FIG. 29, the thickness of the compressed portion (2*a*) of the foam layer (2) is 120 μm, which indicates a reduction in thickness through compression by approximately 34% as compared with the original thickness (350 μm). The thickness of the skin layer (1) is 25 μm, which indicates a reduction in thickness through compression by approximately 83% as compared with the original thickness (30 μm).

Comparative Example 1

The same laminate sheet (6) as that of Example 1 was produced, and then stamping was performed thereon by the cutter (8) without forming the annular groove portion (6*a*), thereby producing a decorative sheet of Specimen 2.

2. Evaluation of Decorative Sheets

The decorative sheets were measured to be evaluated as follows for wear resistance and alcohol resistance. Table 1 shows the measurement results.

"Wear resistance"; by using a sand eraser (RADIC 500B manufactured by Sakura Color Products Corp.), the outer edge portion of the decorative sheet was rubbed under the conditions of a load of 500 g, a movement stroke of 25 mm, and a reciprocating speed of 60/min. Then, the number of times that the eraser was reciprocated until the decorative sheet suffered breakage was measured. Table 1 shows the measurement values.

"Alcohol resistance"; by using absorbent cotton impregnated with disinfectant alcohol (81.4% of ethanol), outer edge portion of the decorative sheet was rubbed under the conditions of a load of 1000 g, a movement stroke of 25 mm, and a reciprocating speed of 60/min. Then, the number of times that the cotton was reciprocated until the decorative sheet suffers breakage was measured. Table 1 shows the measurement results.

As shown in Table 1, in the wear resistance evaluation, Specimen 1 did not suffer breakage until the sand eraser had been reciprocated 800 times, whereas Specimen 2 suffered breakage in the case where the sand eraser had been reciprocated 600 times. In contrast, the decorative sheet of Specimen 2 suffered breakage in the case where the sand eraser had been reciprocated 600 times. In the alcohol resistance evaluation, the decorative sheet of Specimen 1 did not suffer breakage until the cotton was reciprocated 200 times, whereas the decorative sheet of Specimen 2 suffered breakage in the case where the cotton had been reciprocated five times. The above-mentioned results confirmed that Specimen 1 was a decorative sheet of high durability.

TABLE 1

|  | Specimen 1 | Specimen 2 |
| --- | --- | --- |
| Wear resistance (number of times) | 800 | 600 |
| Alcohol resistance (number of times) | 200 | 5 |

What is claimed is:

1. A decorative key sheet comprising a soft feel layer including
    a skin layer having a back surface and an external surface that is opposite from the back surface and
    a foam layer stacked on the back surface of the skin layer, and
    a first compressed portion as a solid layer foamed at an edge of the foam layer by crushing the foam layer in a thickness direction,
    wherein the edge of the first compressed portion forms and exposes a cut surface of the first compressed portion, and the external surface of the skin layer defines an operation surface of the key sheet by user.

2. A decorative sheet according to claim 1, wherein the foam layer has a through-hole extending through a thickness of the soft feel layer, and wherein the first compressed portion is provided at an edge portion of the through-hole in the foam layer.

3. A decorative sheet according to claim 1, further comprising a shield layer provided on a back surface of the soft feel layer, for interfering conductance of heat and pressure to the soft feel layer.

4. A decorative molded body, comprising the decorative sheet according to claim 1, which is formed on a surface of a core member formed of a molded body.

5. A decorative key sheet according to claim 1, comprising:
a base sheet formed of a resin film;
a key top arranged on the base sheet; and
a frame sheet arranged on the base sheet side by side with the key top,
wherein the frame sheet is formed of the decorative sheet.

6. A decorative key sheet according to claim 1, comprising:
a base sheet formed of a resin film; and
a frame sheet provided on the base sheet, with a display portion being provided on a surface of the frame sheet,
wherein the frame sheet is formed of the decorative sheet .

7. A decorative key sheet according to claim 1, comprising:
a base sheet formed of an elastic material; and
a key top arranged on the base sheet and having a decorated operating surface,
wherein the key top has the decorative sheet .

8. A decorative key sheet according to claim 1, comprising:
a pusher protruding in a depressing direction from the back surface provided on a back surface on a side opposite to an operating surface of a depressing operation portion provided on an operation plate,
wherein the operation plate is formed of the decorative .

9. A method of manufacturing a decorative key sheet comprising;
providing a soft feel layer including
a skin layer having a back surface and an external surface that is opposite from the back surface and
a foam layer stacked on the back surface on an opposite side of an external surface of the skin layer;
compressing the foam layer into a solid layer by crushing the foam layer in a thickness direction from a side of the skin layer of the soft feel layer,
forming a bottomed groove portion during the compressing; and
cutting the soft feel layer in a thickness direction at a bottom surface of the groove portion,
and the external surface of the skin layer defines an operation surface of the key sheet by user.

10. A method of manufacturing a decorative sheet according to claim 9, comprising:
forming the groove portion in an annular configuration; and
cutting the soft feel layer in the thickness direction at the bottom surface of the annular groove portion, to thereby provide a through-hole.

11. A decorative sheet according to claim 1, further comprising:
a second compressed portion as a solid layer which is formed at the foam layer by crushing the foam layer in a thickness direction; and
a through-hole extending through a thickness of the skin layer and the second compressed portion.

12. A decorative key sheet according to claim 1, wherein the first compressed portion has a first surface, opposite from the back surface of the skin layer, substantially parallel to the back surface of the skin layer.

13. A decorative key sheet according to claim 12, the compressed portion further has a second surface which is substantially at a right angle to the external surface of the skin layer, wherein the first surface is between the second surface and the cut surface.

14. A decorative key sheet according to claim 1, the compressed portion has a high density.

15. A decorative key sheet according to claim 14, the density of the compressed portion is of a higher density than that of the foam layer.

* * * * *